United States Patent
Fujimoto et al.

(10) Patent No.: US 8,520,259 B2
(45) Date of Patent: Aug. 27, 2013

(54) IMAGE PROCESSING APPARATUS AND IMAGE PROCESSING METHOD

(75) Inventors: Yasunori Fujimoto, Inagi (JP);
Tomokazu Yanai, Yokohama (JP);
Shinichi Miyazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 742 days.

(21) Appl. No.: 12/480,439

(22) Filed: Jun. 8, 2009

(65) Prior Publication Data
US 2009/0244580 A1 Oct. 1, 2009

Related U.S. Application Data

(63) Continuation of application No. PCT/JP2008/073254, filed on Dec. 19, 2008.

(30) Foreign Application Priority Data

Dec. 20, 2007 (JP) ................................ 2007-329336

(51) Int. Cl.
*H04N 1/40* (2006.01)
*H04N 1/60* (2006.01)
*G03F 3/08* (2006.01)
*G06K 9/00* (2006.01)

(52) U.S. Cl.
USPC ........... 358/3.01; 358/1.9; 358/518; 382/167; 382/164

(58) Field of Classification Search
USPC ................ 358/1.9, 3.01, 518, 501, 1.12, 502, 358/503, 504; 382/162, 167, 164
See application file for complete search history.

(56) References Cited

U.S. PATENT DOCUMENTS

| | | | |
|---|---|---|---|
| 6,511,143 B1 | 1/2003 | Ishikawa et al. | |
| 7,083,255 B2 * | 8/2006 | Shibata et al. | 347/40 |
| 7,296,868 B2 * | 11/2007 | Shibata et al. | 347/15 |
| 2002/0159094 A1 * | 10/2002 | Bybell et al. | 358/3.06 |
| 2003/0025749 A1 | 2/2003 | Krouss | |

(Continued)

FOREIGN PATENT DOCUMENTS

| | | |
|---|---|---|
| EP | 0960739 A2 | 12/1999 |
| EP | 2107789 A2 | 10/2009 |

(Continued)

OTHER PUBLICATIONS

Japanese Office Action issued in the counterpart application No. 2007-329336 dated May 29, 2012, along with its English-language translation—5 pages.

(Continued)

*Primary Examiner* — Madelein A Nguyen
(74) *Attorney, Agent, or Firm* — Fitzpatrick, Cella, Harper & Scinto

(57) ABSTRACT

Graininess is suppressed while at the same time minimizing grayscale variations caused by inter-plane deviations. For this purpose, when a pixel is printed by M relative scans of a print head over a print medium or by a relative scans of M print heads over the print medium, M pieces of multivalued image data is created according to a division number or distribution ratio determined by a grayscale value of that pixel. The M pieces of multivalued image data are individually quantized and then the printing is performed according to the quantized pixel data. This process prevents dot generation delays and graininess from deteriorating in highlighted areas, thus realizing printed images highly robust against density variations.

17 Claims, 17 Drawing Sheets

(56) References Cited

U.S. PATENT DOCUMENTS

| | | |
|---|---|---|
| 2003/0090728 A1 | 5/2003 | Schramm et al. |
| 2005/0073543 A1* | 4/2005 | Nishikori et al. ............... 347/15 |
| 2005/0128229 A1* | 6/2005 | Shibata et al. ..................... 347/6 |
| 2006/0082848 A1* | 4/2006 | Takakura et al. ............. 358/534 |
| 2006/0274098 A1* | 12/2006 | Shibata et al. .................. 347/15 |
| 2007/0236523 A1* | 10/2007 | Nishikori et al. ............... 347/14 |
| 2009/0268240 A1 | 10/2009 | Watanabe et al. |
| 2010/0134544 A1* | 6/2010 | Takamiya et al. ............... 347/11 |

FOREIGN PATENT DOCUMENTS

| | | |
|---|---|---|
| JP | 2000-103088 A | 4/2000 |
| JP | 2001-150701 A | 6/2001 |
| JP | 2006-231736 A | 9/2006 |

OTHER PUBLICATIONS

European Communication issued in the counterpart application No. 08863412.6 dated Sep. 17, 2012—6 pages.

* cited by examiner

| 1/16 | 2/16 | 1/16 |
|---|---|---|
| 2/16 | 4/16 | 2/16 |
| 1/16 | 2/16 | 1/16 |

FIG.11A

| 16 | 32 | 16 |
|---|---|---|
| 32 | 64 | 32 |
| 16 | 32 | 16 |

FIG.11B

BINARY DATA
BEFORE FILTERING    DATA AFTER FILTERING
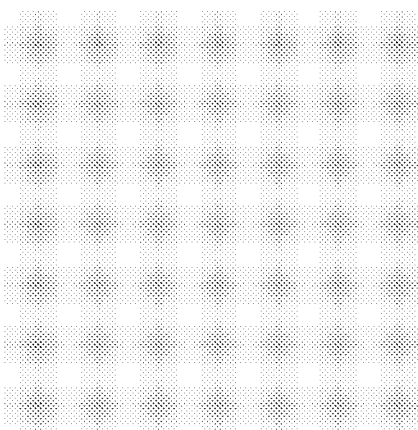
FIG.12

| | * | 9/32 | 3/32 |
|---|---|---|---|
| 5/32 | 9/32 | 3/32 | |
| | 3/32 | | |

FIG.16A

| | | * | 2/8 | 1/8 |
|---|---|---|---|---|
| 1/8 | 1/8 | 2/8 | 1/8 | |

FIG.16B

IMAGE PROCESSING APPARATUS AND IMAGE PROCESSING METHOD

CROSS REFERENCE TO RELATED APPLICATION

This application is a continuation application of PCT/JP2008/073254, filed Dec. 19, 2008, which claims the benefit of JP 2007-329336, filed Dec. 20, 2007, the entire disclosure of each of which is incorporated herein by reference.

BACKGROUND OF THE INVENTION

1. Field of the Invention

The present invention relates to an image processing apparatus and an image processing method that process image data corresponding to unit areas to form an image in the unit areas by moving a print head a plurality of times relative to the unit areas on a print medium or by moving a plurality of print heads relative to the unit areas.

2. Description of the Related Art

As one printing method using a print head having a plurality of printing elements, an ink jet printing method that ejects ink from the individual printing elements to form dots on a print medium is known. Such ink jet printing apparatus can be classified into a full-line type and a serial type in terms of their construction.

A full-line type printing apparatus uses a print head having a plurality of printing elements arranged over as wide a width of the print medium. Then, the print head ejects ink as the print medium is moved in a direction crossing the direction of arrangement of the printing elements in the print head to form an image on the print medium. Such a full-line type printing apparatus can produce an image at a relatively high speed and therefore is suited for office use.

In a serial type printing apparatus, on the other hand, an image is formed progressively by repetitively performing a printing scan for scanning (moving) the ink ejecting print head and a print medium conveying operation for conveying the print medium in a direction crossing the printing scan. Such a serial type printing apparatus can be manufactured in a relatively small size and at a low cost and therefore is suited for a personal use and for use as a wide format printer.

Whether it is of the full-line type or a serial type, there are variations in ink ejection volume and direction among the individual printing elements arrayed in the print head. Such variations may cause density variations or stripes on a printed image.

As a technology to alleviate such image problems, a multipass printing method has been known. In the multipass printing, image data to be printed in a unit area of the print medium is divided into as many pieces of image data as a plurality of relative scans and the divided pieces of image data are sequentially printed by the plurality of relative scans with a print medium conveying operation interposed in between, thus completing the image to be printed in the unit area. Such a multipass printing method can alleviate image problems caused by ejection variations among different printing elements. As a result, a uniform, smooth image can be obtained. The multipass printing produces greater effects as the number of passes, i.e., the number of printing elements used to print one scan raster, is increased. It is noted, however, that since the increased number of passes results in a reduced printing speed, the serial type printing apparatus often provides multiple print modes with different number of passes, such as one giving priority to the image quality and one giving priority to the printing speed.

The above multipass printing method can be applied to the full-line type printing apparatus. That is, as shown in FIG. 1, two or more printing element arrays of each color are arranged in a print medium conveying direction so that a rasterized line can be printed by a plurality of printing elements, alleviating adverse effects caused by ejection variations among individual printing elements.

In performing the multipass printing described above, it is necessary to distribute image data among individual printing scans in the serial type printing apparatus and, in the full-line type printing apparatus, to distribute image data among individual print heads. Such a distribution of image data has often been performed by using a mask pattern comprising printable pixels (1) in which a dot is permitted to be printed and unprintable pixels (0) in which a dot is not permitted to be printed.

FIG. 13 shows one example of the mask pattern that can be used in a 2-pass printing. Areas painted black represent the printable pixels (1) and blank areas represent the unprintable pixels (0). Denoted 1801 is a mask pattern used for a first pass of the printing scan and 1802 for a second pass. The pattern 1801 and the pattern 1802 are in a complementary relationship.

By performing an AND operation between the mask patterns and binary image data, the binary image data is divided into pieces that are to be printed by different printing scans. For example, as shown in FIG. 2, the image data representing dots to be printed in a unit area is divided by mask patterns (1801, 1802) of FIG. 13 to generate divided image data for 1st pass and divided image data for 2nd pass. In this mask-based data dividing method that uses complementary mask patterns, the possibility of dots printed in different scans overlapping each other is low since the binary image data assigned to different scans also have a complementary relationship.

With demands for even higher image quality growing in recent years while the multipass printing is employed, density variations or density unevenness caused by registration errors (print position deviations) among different printing scans or among different printing element arrays have come to be spotlighted as problems. The print position deviations among different printing scans or among different printing element arrays are caused by variations in distance between a print medium and an ejection opening face of the print head (head-medium distance) and by variations in the distance that the print medium is conveyed.

For example, referring to FIG. 2, let us consider a case where a dot (○) plane printed in a preceding printing scan and a dot (☉) plane printed in a subsequent printing scan are shifted by one pixel either in the main scan direction or subscan direction. At this time, the dots (○) printed in the preceding printing scan and the dots (☉) printed in the subsequent printing scan completely overlap, leaving blank areas exposed, lowering the density or grayscale value of a printed image. Even if the two planes of dots are not shifted by as large as one pixel, variations in adjoining dot distance and in overlapping amount change a dot coverage over the blank areas, which in turn causes variations in grayscale value of the image. Such grayscale value variations appear as density unevenness.

Therefore, with higher quality of images being called for in recent years, there is a growing demand for an image data processing method in a multipass printing that can deal with print position deviations between different dot planes caused by variations of printing conditions. In the descriptions that follow, a capability to oppose density variations or density unevenness caused by inter-plane print position deviations, whatever printing condition variations they may be caused by, is referred to as a "robustness".

Japanese Patent Laid-Open No. 2000-103088 discloses an image data processing method for enhancing the robustness. This patent document focuses on the fact that image density variations caused by variations in print condition stem from different pieces of binary image data used in different printing scans being in a complementary relationship. The patent document recognizes that generating pieces of image data used in different printing scans in ways that will reduce the complementary relationship can realize a highly robust multipass printing. Japanese Patent Laid-Open No. 2000-103088 therefore divides the image data in the form of multivalued data before binarization and then independently binarizes the divided pieces of multivalued data, thereby preventing large density variations from occurring even if different planes of image data used in different printing scans are printed deviated from each other.

FIG. 3 shows the process of data division described in Japanese Patent Laid-Open No. 2000-103088. First, the multivalued data to be printed in a unit area (see A) is divided into a piece of multivalued data to be printed in a first pass (see D) and a piece of multivalued data to be printed in a second pass (see E). Next, these divided multivalued data are individually binarized to create a piece of binary data to be printed in the first pass (see H) and a piece of binary data to be printed in the second pass (see I). Finally, the print head ejects ink according to these binary data. As can be seen from (H) and (I), the first pass binary data and the second pass binary data created as described above are not in the complementary relationship. Therefore, locations where dots of the first pass and the second pass overlap (i.e., pixels that have "1" in both of the two planes) and locations where dots of the first and second pass do not overlap (i.e., pixels that have "1" in only one of the two planes) exit simultaneously.

FIG. 4 shows dots printed on a print medium according to the method of Japanese Patent Laid-Open No. 2000-103088. In the figure, black circular dots 21 represent dots printed in the first pass, blank circular dots 22 represent dots printed in the second pass and hatched circular dots 23 represent dots printed overlappingly in the first and second pass. In this example, since the complementary relationship between the first pass dots and the second pass dots is incomplete, as opposed to the case of FIG. 2 where the first and the second pass dots are in a complete complementary relationship, there are areas where two dots overlap and areas where no dots are printed (blank areas).

Here, let us consider a case in which dots printed in the first pass and dots printed in the second pass are shifted by one pixel either in the main scan direction or in the subscan direction, as in the case of FIG. 2. In that case, the first and second pass dots that are supposed not to overlap if the print position deviation does not occur, now overlap. At the same time, other dots—the dots 23 that are supposed to overlap if the print position deviation does not occur—do not overlap. Therefore, considering a certain expanse of printed area, the dot coverage over the blank areas changes little and therefore the image density change is small. That is, with the method of Japanese Patent Laid-Open No. 2000-103088, if the distance between the print medium and the ejection opening face (head-medium distance) changes or if the print medium conveying distance changes, it is possible to prevent image density variations that may be induced by these changes.

Further, Japanese Patent Laid-Open No. 2006-231736 discloses the technology that distributes pieces of image data in the form of multivalued data to a plurality of printing scans or a plurality of printing element arrays, like Japanese Patent Laid-Open No. 2000-103088, and at the same time changes a distribution ratio of the multivalued image data according to the position of pixels. This patent document describes its capability to limit banding and color banding in the multipass printing by changing the distribution ratio according to the pixel positions in the main scan direction, linearly, cyclically, sinusoidally or based on a combination of high and low frequency waves.

However, even with Japanese Patent Laid-Open No. 2000-103088 and Japanese Patent Laid-Open No. 2006-231736 (multivalued data dividing method), the inventors of this invention have found that, when a grayscale value of the image data is low (image density is low), image impairments may emerge in an output image. The image impairments are described as follows.

FIG. 5A shows how an image is processed and how dots are printed when the image data is divided in the form of multivalued data into two planes before being binarized by an error diffusion method. FIG. 5B shows how an image is processed and how dots are printed when the image data is directly binarized without being divided into two planes. Here, an original image 50 is assumed to be a uniform half-tone image having a relatively low grayscale value of 11/255 in a grayscale range of 0-255. According to the method of Japanese Patent Laid-Open No. 2000-103088, the original image 50 in the multivalued state is divided into two planes 51a and 51b having a grayscale value of 5/255 and 6/255 respectively. Then, the two planes are subjected to the binarization operation based on the error diffusion method to create binary plane images 52a and 52b. These two plane images 52a and 52b are printed overlappingly to produce an output image 53.

FIG. 5B shows image processing and a printed state when the image data is directly binarized based on the error diffusion method without being subjected to the plane division. The original image 50 at the grayscale value of 11/255 is binarized, without being divided into planes, to generate an output image 54.

Here, comparison between the output images 53 and 54 shows that there are more blank areas in an upper end portion of the output image 53 than in the output image 54. This is due to the fact that dots are not arranged in the upper end portion of any of the two plane images 52a and 52b before being overlapped. Such a dot arrangement is characteristic of the image processing that employs the error diffusion method.

Where the binarization is based on the error diffusion method, whether a dot is to be printed or not in individual pixels is determined by whether the grayscale value of each pixel of interest is higher than a predetermined threshold (e.g., 128). More specifically, when the grayscale value is higher than the threshold, it is determined that a dot shall be printed (255). When it is lower than the threshold, it is determined that a dot shall not be printed (0). An error between the output value and the input value in each pixel of interest is distributed to surrounding pixels that are not yet binarized, so that a certain range of grayscale value is stored before and after the binarization operation. At this time, when an image has relatively low, uniform grayscale values, the binarization operation is performed for many pixels until the error is accumulated to exceed the threshold. Generally, the pixel of interest moves from left to right and from top to bottom, so the position at which a first dot is printed is some distance from the top edge of the print medium, as shown in FIG. 5A. Therefore, the lower the grayscale value (or density) of each pixel, the smaller the error that is accumulated and the larger the distance from the top edge of the print medium. Here, a phenomenon in which the pixel printing is delayed as described above is referred to as a "dot generation delay".

That is, the division of the original image 50 with a grayscale value of 11 into two planes, as shown in FIG. 5A, has contributed to the dot generation delay, increasing the blank portion near the top edge of the print medium. As can be seen from the comparison between the output image 53 and the output image 54, such a dot generation delay hinders an appropriate dispersion of dots, resulting in a loss of uniformity of the image. This phenomenon is similarly observed with multipass printing of more than two passes.

On the other hand, with the construction in which there is no correlation of binary data among a plurality of planes, such as shown in Japanese Patent Laid-Open No. 2000-103088, a graininess of the printed image may get worse in areas where the grayscale values are low. For example, referring again to FIG. 5A and FIG. 5B, since the binary plane images 52a and 52b are not correlated and are independently binarized, there are areas in the combined output image 53 where a plurality of dots overlap or lie side by side. Therefore, compared with the output image 54 in which all dots are uniformly dispersed with the errors of all dots diffused, the combined output image 53 shows dot aggregates, degrading the graininess.

Such degraded graininess is caused not by the binarization method but by the fact that a plurality of planes have no correlation, such as a complementary relationship. So, if a binarization method other than the one based on the error diffusion method shown in FIGS. 5A and 5B is employed, the above image impairment still emerges. For example, in a dither matrix method, when relatively similar matrices are used, a probability of dots on different planes overlapping each other increases, further deteriorating the graininess.

The multivalued data dividing method of Japanese Patent Laid-Open No. 2000-103088 is most likely to be effective when the grayscale value is such that the dot overlapping state greatly affects the dot coverage over the blank areas, e.g., when the grayscale value results in the dot coverage of about 30% to 60%. However, in an image with low grayscale values, such as shown in FIGS. 5A and 5B, the distances between dots are relatively large so that shifts between different planes do not result in a sharp density variations. In this case, therefore, the method is not likely to show its effectiveness. Further, in low-grayscale images, since dots are sparsely scattered and the dot-to-dot distances are large, even if dots arrayed in the main scan direction are printed by the same printing element, image impairments such as stripes are hardly recognized. This means that the multipass printing is not likely to show its effectiveness in such low-grayscale images.

On the other hand, in low-grayscale images, dot dispersion and graininess often become sensitive issues attracting attention and can be degraded by the dot generation delay shown in FIG. 5A and aggregates of multiple dots.

SUMMARY OF THE INVENTION

The present invention has been accomplished to solve the above-mentioned problems and its objective is to suppress dot graininess while limiting density variations caused by inter-plane deviations.

For this purpose, the present invention of claim 1 is characterized in an image processing apparatus to process input image data so that the input image data can be printed on an associated pixel of a print medium by a plurality of relative movements of a print head over the print medium, the image processing apparatus comprising: a generation means to generate, based on the input image data, a plurality of pieces of multivalued image data for the plurality of relative movements; and a quantization means to quantize each of the plurality of pieces of multivalued image data generated by said generation means; wherein said generation means generates the plurality of pieces of multivalued image data such that the number of relative movements available for printing a pixel having a grayscale value of the input image data lower than a threshold is smaller than the number of relative movements available for printing a pixel having a grayscale value of the input image data higher than the threshold.

The present invention of claim 2 is characterized in an image processing apparatus to process input image data so that the input image data can be printed on an associated pixel of a print medium by a relative movement of a plurality of print heads over the print medium, the image processing apparatus comprising: a generation means to generate, based on the input image data, a plurality of pieces of multivalued image data for the plurality of print heads; and a quantization means to quantize each of the plurality of pieces of multivalued image data generated by said generation means; wherein said generation means generates the plurality of pieces of multivalued image data such that the number of print heads available for printing a pixel having a grayscale value of the input image data lower than a threshold is smaller than the number of print heads available for printing a pixel having a grayscale value of the input image data higher than the threshold.

The present invention of claim 3 is characterized in an image processing apparatus to process input image data so that the input image data can be printed on an associated pixel of a print medium by a plurality of relative movements of a print head over the print medium, the image processing apparatus comprising: a generation means to generate, based on the input image data, a plurality of pieces of multivalued image data for the plurality of relative movements; and a quantization means to quantize each of the plurality of pieces of multivalued image data generated by said generation means; wherein said generation means generates the plurality of pieces of multivalued image data without dividing the grayscale value of the input image data when the grayscale value of the input image data is lower than a threshold and, when the grayscale value of the input image data is higher than the threshold, generates the plurality of multivalued image data by dividing the grayscale value of the input image data.

The present invention of claim 4 is characterized in an image processing apparatus to process input image data so that the input image data can be printed on an associated pixel of a print medium by a relative movement of a plurality of print heads over the print medium, the image processing apparatus comprising: a generation means to generate, based on the input image data, a plurality of pieces of multivalued image data for the plurality of print heads; and a quantization means to quantize each of the plurality of pieces of multivalued image data generated by said generation means; wherein said generation means generates the plurality of pieces of multivalued image data without dividing the grayscale value of the input image data when the grayscale value of the input image data is lower than a threshold and, when the grayscale value of the input image data is higher than the threshold, generates the plurality of pieces of multivalued image data by dividing the grayscale value of the input image data.

The present invention of claim 5 is characterized in an image processing apparatus to process input image data so that the input image data can be printed on an associated pixel of a print medium by a plurality of relative movements of a print head over the print medium, the image processing apparatus comprising: a generation means to generate a plurality of pieces of multivalued image data for the plurality of relative movements by dividing the input image data according to a dividing number corresponding to a grayscale value of the input image data; and a quantization means to quantize each of the plurality of pieces of multivalued image data generated by said generation means; wherein the division number for the input image data having a grayscale value lower than a threshold is smaller than a division number for the input image data having a grayscale value higher than the threshold.

The present invention of claim 6 is characterized in an image processing apparatus to process input image data so that the input image data can be printed on an associated pixel of a print medium by a relative movement of a plurality of print heads over the print medium, the image processing apparatus comprising: a generation means to generate a plurality of pieces of multivalued image data for the plurality of print heads by dividing the input image data according to a division number corresponding to a grayscale value of the input image data; and a quantization means to quantize each of the plurality of pieces of multivalued image data generated by said generation means; wherein the division number for the input image data having a grayscale value lower than a threshold is smaller than a division number for the input image data having a grayscale value higher than the threshold.

The present invention of claim 12 is characterized in an image processing method for processing input image data so that the input image data can be printed on an associated pixel of a print medium by a plurality of relative movements of a print head over the print medium, the image processing method comprising the steps of: generating, based on the input image data, a plurality of pieces of multivalued image data for the plurality of relative movements; and quantizing each of the plurality of pieces of multivalued image data generated by the generation step; wherein the generation step generates the plurality of pieces of multivalued image data such that the number of relative movements available for printing a pixel having a grayscale value of the input image data lower than a threshold is smaller than the number of relative movements available for printing a pixel having a grayscale value of the input image data higher than the threshold.

The present invention of claim 13 is characterized in an image processing method for processing input image data so that the input image data can be printed on an associated pixel of a print medium by a relative movement of a plurality of print heads over the print medium, the image processing method comprising the steps of: generating, based on the input image data, a plurality of pieces of multivalued image data for the plurality of print heads; and quantizing each of the plurality of pieces of multivalued image data generated by the generation step; wherein the generation step generates the plurality of pieces of multivalued image data such that the number of print heads available for printing a pixel having a grayscale value of the input image data lower than a threshold is smaller than the number of print heads available for printing a pixel having a grayscale value of the input image data higher than the threshold.

The present invention of claim 14 is characterized in an image processing method for processing input image data so that the input image data can be printed on an associated pixel of a print medium by a plurality of relative movements of a print head over the print medium, the image processing method comprising the steps of: generating, based on the input image data, a plurality of pieces of multivalued image data for the plurality of relative movements; and quantizing each of the plurality of pieces of multivalued image data generated by the generation step; wherein the generation step generates the plurality of pieces of multivalued image data without dividing the grayscale value of the input image data when the grayscale value of the input image data is lower than a threshold and, when the grayscale value of the input image data is higher than the threshold, generates the plurality of pieces of multivalued image data by dividing the grayscale value of the input image data.

The present invention of claim 15 is characterized in an image processing method for processing input image data so that the input image data can be printed on an associated pixel of a print medium by a relative movement of a plurality of print heads over the print medium, the image processing method comprising the steps of: generating, based on the input image data, a plurality of pieces of multivalued image data for the plurality of print heads; and quantizing each of the plurality of pieces of multivalued image data generated by the generation step; wherein the generation step generates the plurality of pieces of multivalued image data without dividing the grayscale value of the input image data when the grayscale value of the input image data is lower than a threshold and, when the grayscale value of the input image data is higher than the threshold, generates the plurality of pieces of multivalued image data by dividing the grayscale value of the input image data.

The present invention of claim 16 is characterized in an image processing method for processing input image data so that the input image data can be printed on an associated pixel of a print medium by a plurality of relative movements of a print head over the print medium, the image processing method comprising the steps of: generating a plurality of pieces of multivalued image data for the plurality of relative movements by dividing the input image data according to a division number corresponding to a grayscale value of the input image data; and quantizing each of the plurality of pieces of multivalued image data generated by the generation step; wherein the division number for the input image data having a grayscale value lower than a threshold is smaller than a division number for the input image data having a grayscale value higher than the threshold.

The present invention of claim 17 is characterized in an An image processing method for processing input image data so that the input image data can be printed on an associated pixel of a print medium by a relative movement of a plurality of print heads over the print medium, the image processing method comprising the steps of: generating a plurality of pieces of multivalued image data for the plurality of print heads by dividing the input image data according to a division number corresponding to a grayscale value of the input image data; and quantizing each of the plurality of pieces of multivalued image data generated by the generation step; wherein the division number for the input image data having a grayscale value lower than a threshold is smaller than a division number for the input image data having a grayscale value higher than the threshold.

Further features of the present invention will become apparent form the following description of exemplary embodiments (with reference to the attached drawings).

BRIEF DESCRIPTION OF THE DRAWINGS

FIG. 11A shows coefficients used in an filtering operation that a limitation information calculation unit 208 performs on first plane binary data output from a binarization unit 207.

FIG. 11B shows calculated results obtained during an filtering operation that a limitation information calculation unit 208 performs on first plane binary data output from a binarization unit 207.

FIG. 12 is an image showing an output result from the binarization unit 207 and a result obtained by performing a filtering operation of FIG. 12 on the output result.

FIG. 16A is an example of error distribution matrix showing distribution coefficients that a binarization unit 104 uses when it performs an error diffusion operation to distribute errors to surrounding pixels.

FIG. 16B is another example of error distribution matrix showing distribution coefficients that a binarization unit 104 uses when it performs an error diffusion operation to distribute errors to surrounding pixels.

DESCRIPTION OF THE EMBODIMENTS

Now, embodiments of this invention will be described in detail by referring to the accompanying drawings. While embodiments described in the following use an ink jet printing apparatus, it is noted that the present invention is not limited to the ink jet printing apparatus. This invention can be effectively applied to any apparatus other than the ink jet printing apparatus as long as the apparatus prints dots or an image on a print medium by a print head as it moves relative to the print medium.

Here, terms used in this document are defined. First, "relative scan (relative movement)" refers to an operation to move a print medium relative to the print head in the case of a full-line type printing apparatus. In a serial type printing apparatus, the "relative scan" refers to an operation to move (scan) the print head relative to the print medium.

"Multipass printing" refers to a printing method that completes an image to be printed in a unit area of the print medium by performing a plurality of relative scans or performing a relative scan of a plurality of print heads (printing element arrays). That is, an operation in which a print medium is conveyed only once relative to a plurality of print heads (printing element arrays), as in the case of embodiment 1, is referred to as "multipass printing" for convenience. "Number of passes (M)" means the number of relative movements of the print head of the same color (printing element array of the same color) over the unit area. M is an integer equal to 2 or greater. If M=2, the operation is a 2-pass printing and, if M=4, a 4-pass printing. If S print heads of the same color (S printing element arrays of the same color) move relative to the unit area T times, then M=S×T. For example, if one print head of the same color (one printing element array of the same color) moves twice relative to the unit area, as in embodiment 5, S=1 and T=2 and therefore M=2. If two print heads of the same color (two printing element arrays of the same color) moves once relative to the unit area, as in embodiment 1, S=2 and T=1 and thus M=2. In an M-pass printing (M is an integer equal to 2 or greater), image data for M planes corresponding to the multipass number M are generated based on multivalued image data for the unit area. Then, M pieces of image data for the M planes are individually printed in the M passes.

"Unit area" on a print medium refers to an area composed of a predetermined number of pixels (here the predetermined number is an integer equal to 1 or more). Pixel refers to a minimum unit area whose grayscale value can be represented by multivalued data.

Plane refers to a set of image data corresponding to one relative movement of one print head and the print medium. So, different planes correspond different relative movements. When there are a plurality of print heads (printing element arrays) for the same ink color, different planes correspond different print heads (printing element arrays).

Embodiment 1

Figure 1:
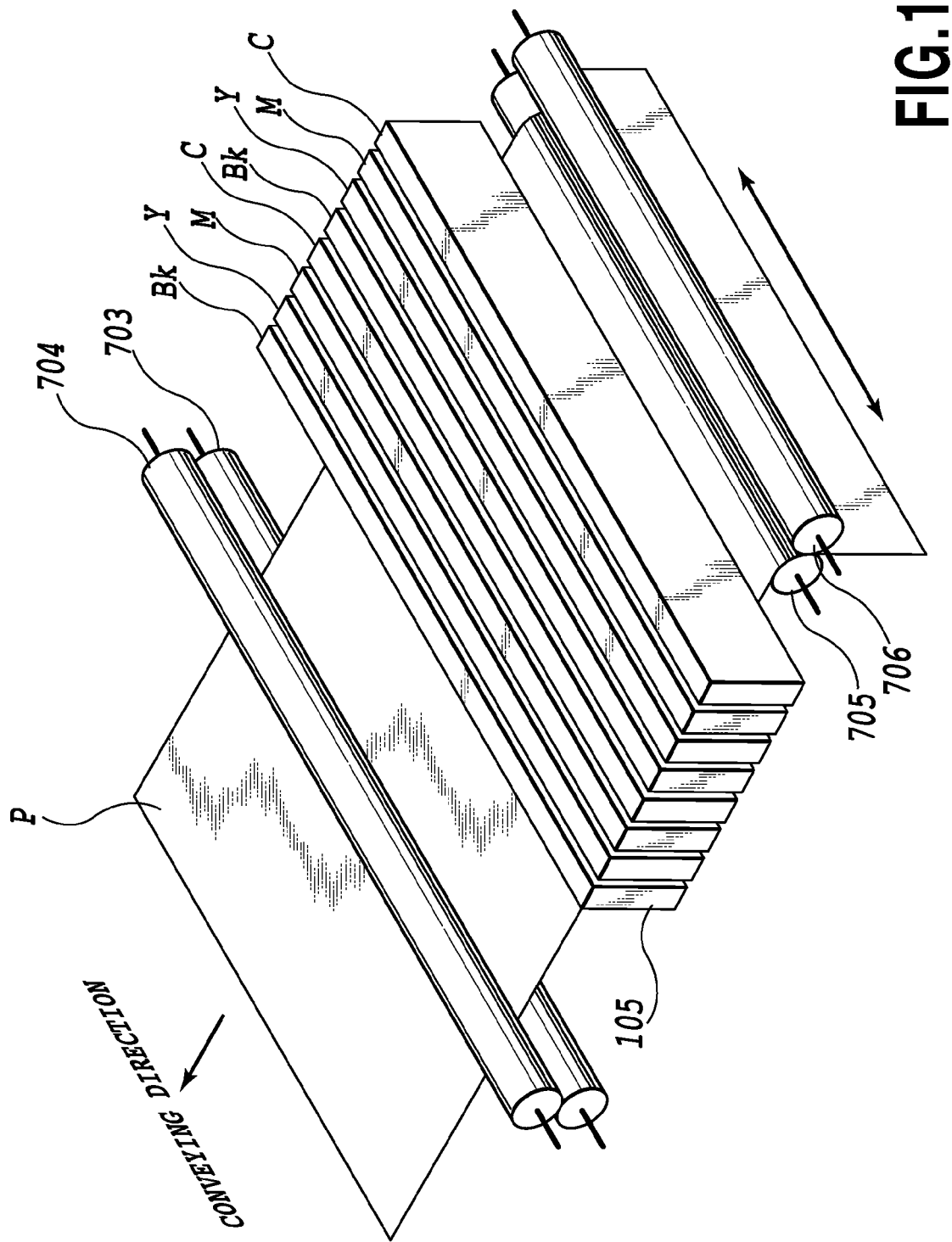
FIG. 1 is a schematic diagram showing an inner construction of a full-line type ink jet printing apparatus as one embodiment of this invention.
Figure 2:
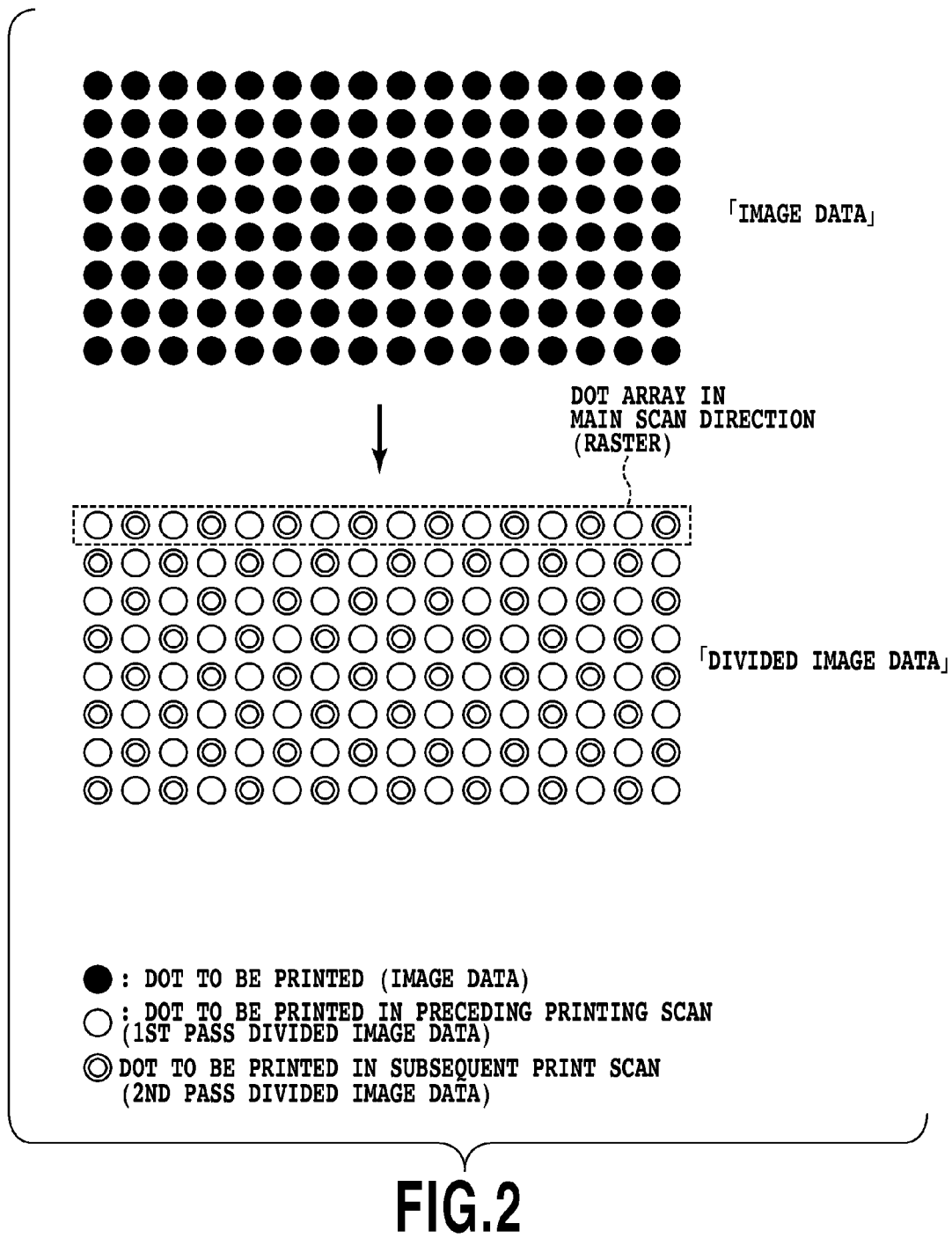
FIG. 2 is a schematic diagram showing how binary image data is divided into two pieces of image data corresponding to two printing scans by a mask pattern of FIG. 13.
Figure 3:
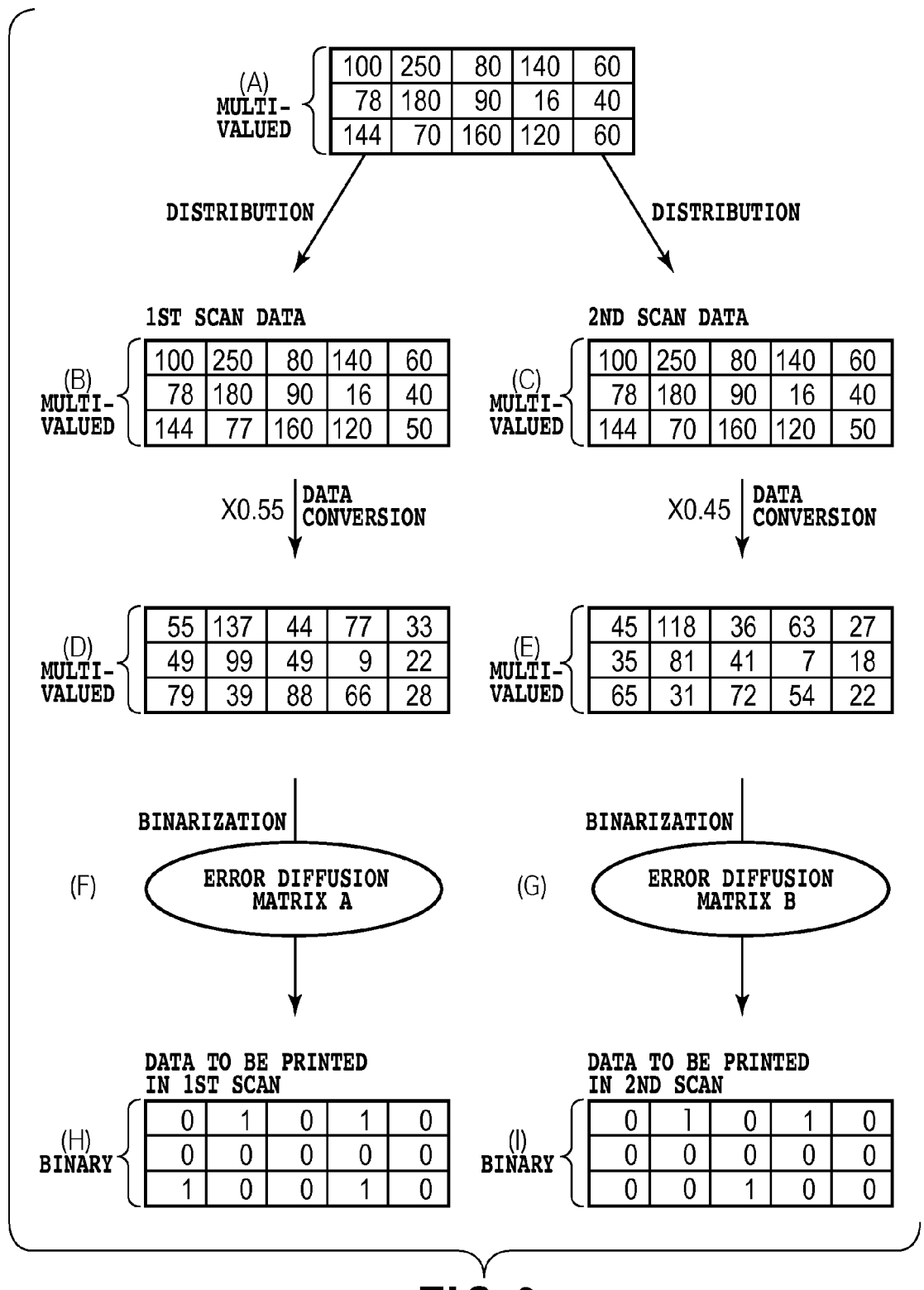
FIG. 3 is a schematic diagram showing a data dividing operation as disclosed in Japanese Patent Laid-Open No. 2000-103088.

FIG. 1 is a schematic diagram showing an internal construction of a full-line type ink jet printing apparatus used in this embodiment. A print medium P is fed by a supply roller 705 and an auxiliary roller 706 and conveyed toward a conveying roller 704 and an auxiliary roller 703, which grip and convey the print medium in a direction of arrow. As the print medium is conveyed as described above, a print head 105 ejects ink from its printing elements to form an image on it. This print medium conveying operation corresponds to the relative scan (relative movement) of the print medium and the print head.

The print head 105 has eight full-line type print heads for four colors—black (Bk), cyan (C), magenta (M) and yellow (Y)—arrayed in the print medium conveying direction, with each color assigned two parallel print heads. Each of the print heads has a plurality of printing elements arrayed in a direction perpendicular to the conveying direction. Image data for Bk, C, M and Y are each divided into two planes, and 1-pixel-width area (unit area) continuously extending in the print medium conveying direction is printed with dots by two print heads (two printing element) for each color. As described above, in this embodiment the image data to be printed in the 1-pixel-width area (unit area) is divided and allocated to two print heads of the same ink color and printed by a 2-pass printing in one relative movement of the print head and the print medium.

Figure 6:
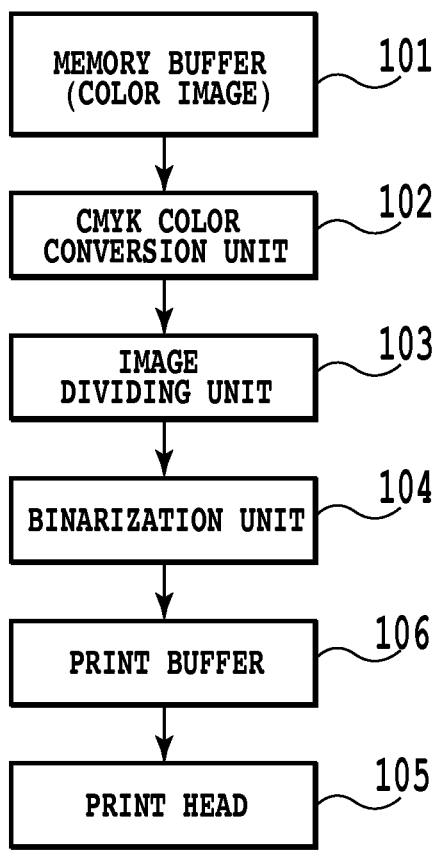
FIG. 6 is a block diagram showing a sequence of steps of image processing as performed by the printing apparatus of embodiment 1.

FIG. 6 is a block diagram showing the image processing executed by the printing apparatus of this embodiment. When image data to be printed is received from an externally connected host device, for example, the image data is stored in a memory buffer 101 in the printing apparatus. The image data at this time is multivalued brightness data (R, G, B) represented by an 8-bit 256-value for each pixel. The brightness data stored in the memory buffer 101 is then transferred, one pixel at a time, to a CMYK conversion unit 102 where it is converted into multivalued density data (e.g., 8-bit 256-grayscale value) that matches the ink color used by the printing apparatus.

An image dividing unit 103, according to a dividing number or distribution ratio corresponding to the grayscale value of image data for each pixel, processes the density data (input image data) from the CMYK conversion unit 102 to create two planes of multivalued data corresponding to the two print heads of each color.

Figure 7:
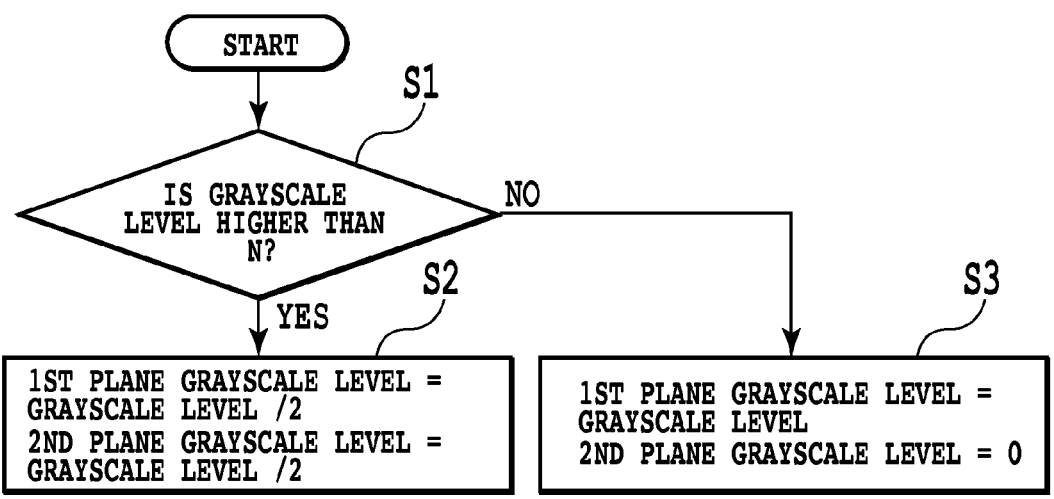
FIG. 7 is a flow chart showing a sequence of steps performed on individual pixels by an image dividing unit 103 of embodiment 1.

FIG. 7 is a flow chart showing a sequence of steps that the image dividing unit 103 of this embodiment performs on individual pixels during a plane dividing process. The image dividing unit 103 in step S1 checks if the grayscale value (density value) of a pixel of interest is higher than a threshold n. The higher the grayscale value (density value), the higher the density it represents. If the grayscale value of the pixel of interest is found to be higher than the threshold n, the process moves to step S2 where the grayscale value of image data is divided into a first print head plane and a second print head plane. That is, according to the distribution ratio of [1st plane: 2nd plane=1:1], the multivalued image data is divided in two, creating two planes of data. If on the other hand the grayscale value of the pixel is determined to be less than the threshold n, the process proceeds to step S3 where all the grayscale value of the image data is distributed to the first print head plane, and grayscale value 0 is allocated to the second print head plane. That is, according to the distribution ratio of [1st plane: 2nd plane=1:0], two planes of data are created, without the original multivalued image data being divided. As described above, for the pixels having grayscale values higher than the threshold (high grayscale pixels), the image dividing unit 103 generates two planes of image data according to the distribution ratio (1:1) so that the probability of the high grayscale pixel being printed by two print heads becomes high. On the other hand, for the pixels having grayscale values less than the threshold (low grayscale value pixels), the image dividing unit 103 creates two planes of image data according to the distribution ratio (1:0) so that the probability of the low grayscale value pixel being printed by one print head becomes high.

Figure 17:
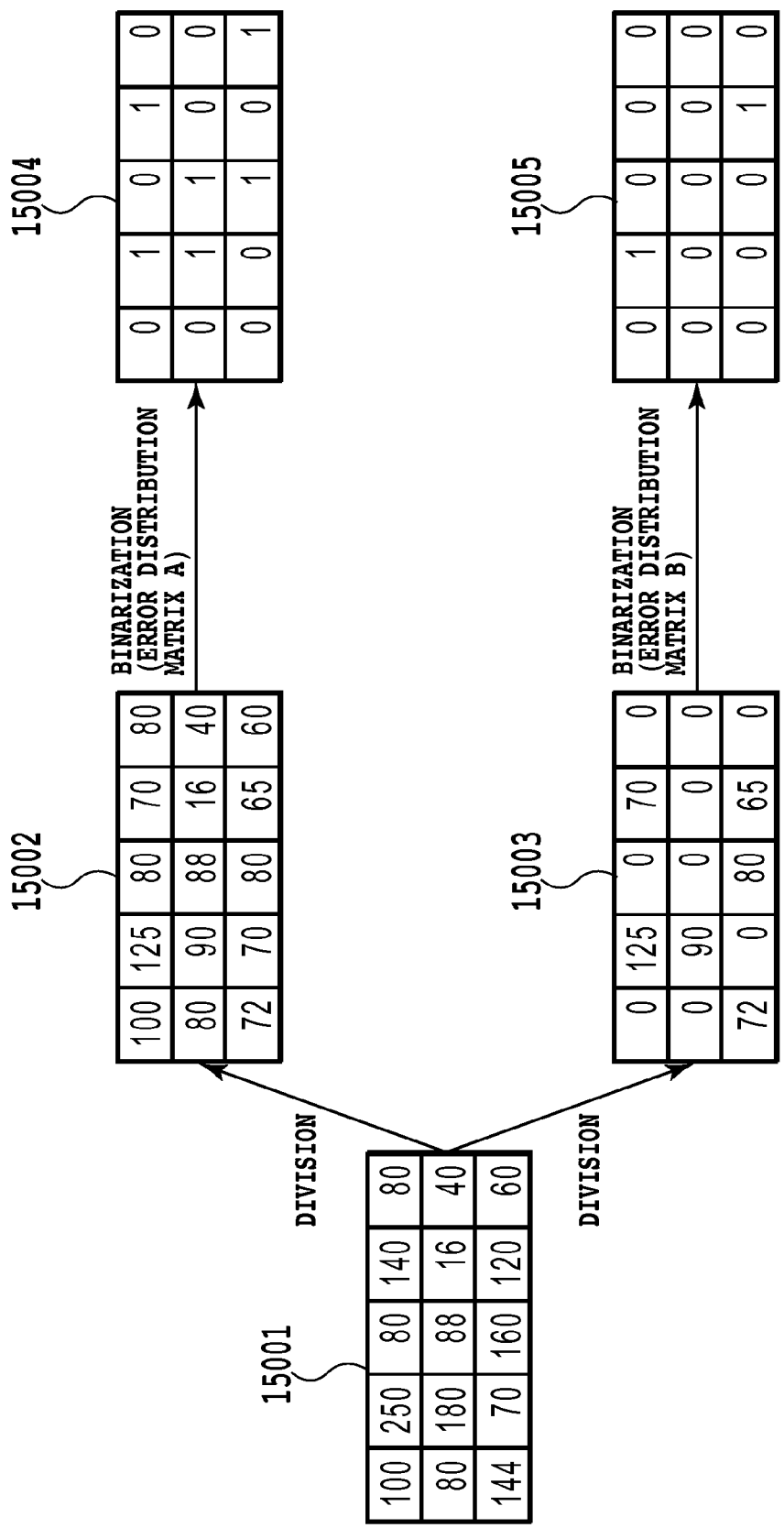
FIG. 17 is a schematic diagram showing how image processing is performed according to embodiment 1.

Returning to FIG. 6, the multivalued image data generated by the image dividing unit 103 is subjected, plane by plane, to the binarization operation by the binarization unit 104. This binarization may use a known error diffusion method or a dither matrix method. It is, however, preferred that the binarization method be differentiated between the two planes. The binarization operation should particularly preferably be performed such that, when the two planes are overlapped, two kinds of locations—where dots overlap and where they don't—exist together, as shown in FIG. 17 described later. For example, when an error diffusion method is used as the binarization operation, a consideration should be taken, as by differentiating the thresholds and the error distribution matrices between the two planes, to ensure that if image data of the same grayscale values are entered, the binarization results will not be the same. More specifically, the error diffusion operation for one plane may use an error distribution matrix such as shown in FIG. 16A while the error diffusion operation for the other plane may use an error distribution matrix such as shown in FIG. 16B, in order to differentiate the dot arrangements between the planes. The dot arrangements may also be differentiated between the two planes by using different dither matrices in the two planes. Furthermore, the dot arrangement differentiation between the two planes can also be achieved by using the dither matrix in one plane and the error diffusion method in the other.

Figures 5A, 5B:
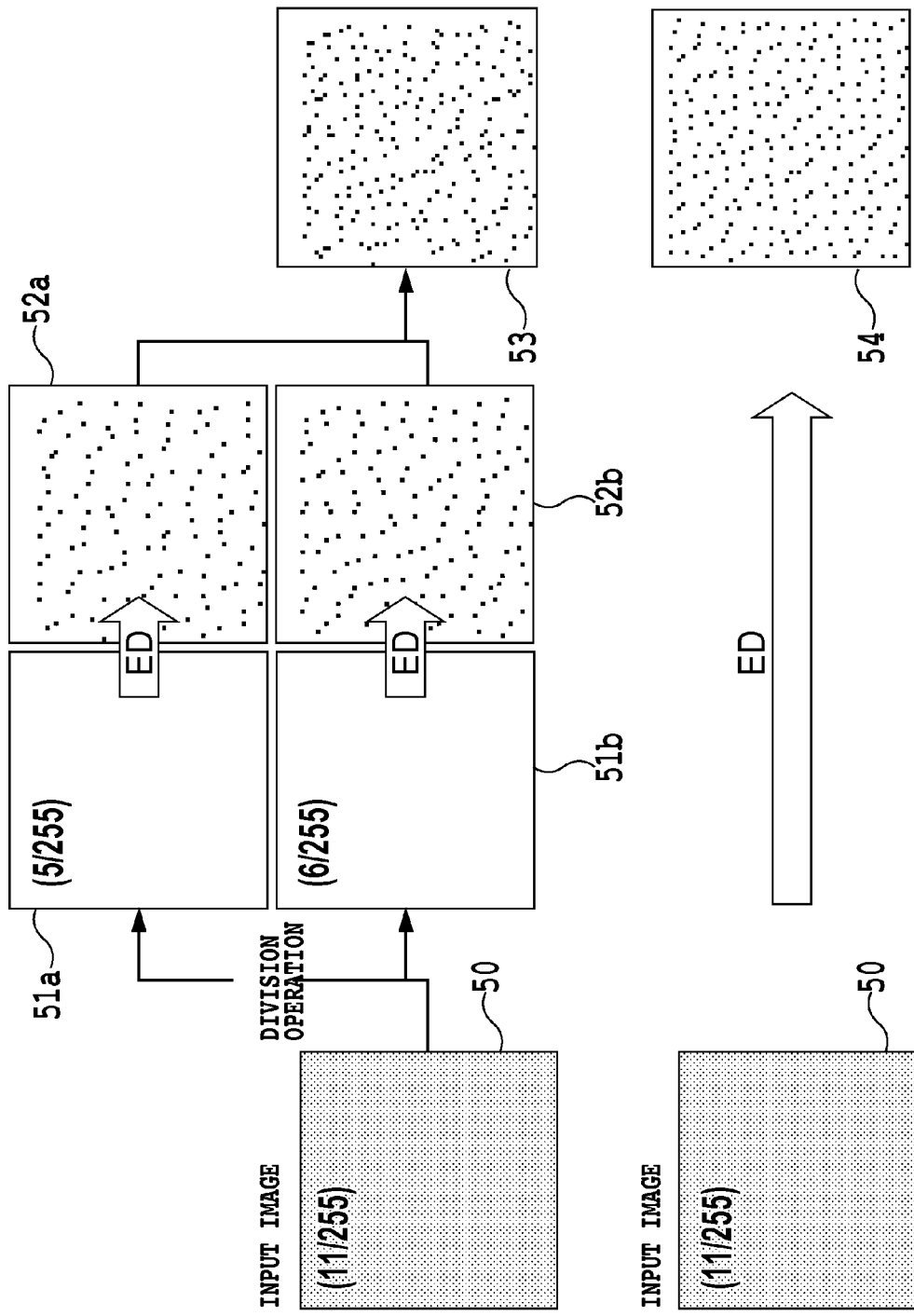
FIG. 5A shows an image processing operation and a printed state of dots when image data in the form of multi-valued data is divided into two planes before being binarized.
FIG. 5B shows an image processing operation and a printed state of dots when image data, without being divided into planes, is directly binarized.

FIG. 17 is a schematic diagram showing an example of image processing executed by the image dividing unit 103 and the binarization unit 104 of FIG. 5. The image dividing unit 103, according to the above-described dividing number or distribution ratio and the grayscale value of the multivalued image data, divides multivalued image data 15001 to be printed in a 5×3-pixel unit area. That is, the multivalued image data representing grayscale values higher than the threshold is divided, according to the above-described distribution ratio (1:1), into first plane multivalued data and second plane multivalued data. If the value of the multivalued image data is an odd number, it cannot be divided strictly to the distribution ratio of 1:1. It is however divided almost to that ratio. Take a grayscale value of 127 for example. Of this value, 64 is distributed to the first plane and 63 to the second plane. As for the multivalued image data representing grayscale values less than the threshold, the grayscale value of the multivalued image data is distributed as is to the first plane, with 0 distributed to the second plane. As a result, from the multivalued image data 15001, first plane multivalued image data 15002 and second plane multivalued image data 15003 are created.

Next, the binarization unit 104 performs the error diffusion method-based binarization operation on each piece of multivalued image data (15002 and 15003) created by the image dividing unit 103. As a result, first plane binary image data 15004 and second plane binary image data 15005 are created. More specifically, the first plane multivalued image data 15002 is subjected to the error diffusion operation using the error distribution matrix A of FIG. 16A to create the first plane binary image data 15004. And the second plane multivalued image data 15003 is subjected to the error diffusion operation using the error distribution matrix B of FIG. 16B to create the second plane binary image data 15005. Marks * in FIG. 16A and FIG. 16B represent pixels of interest.

Figure 4:
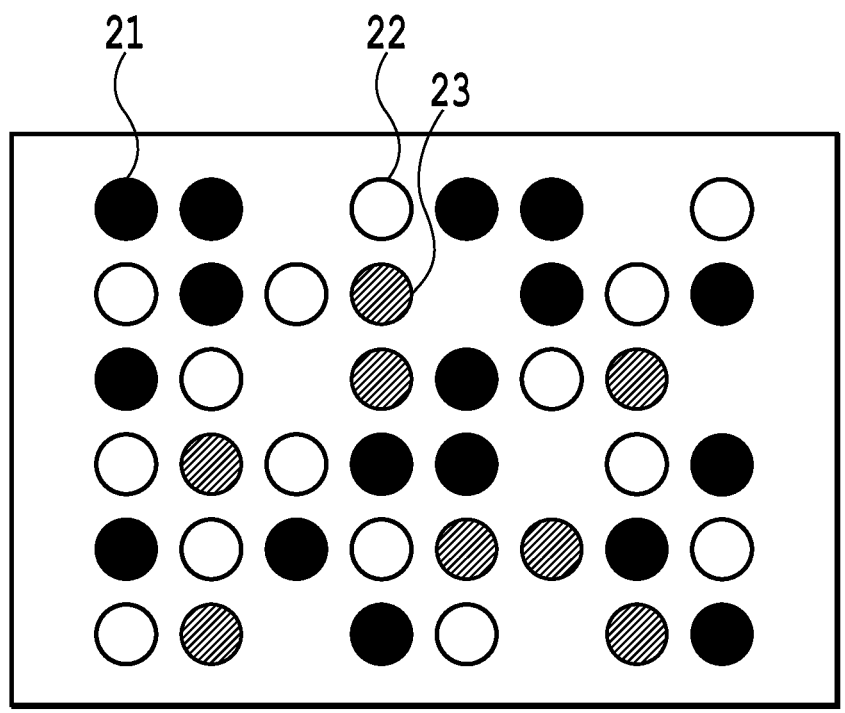
FIG. 4 shows dots printed on a print medium by the method of Japanese Patent Laid-Open No. 2000-103088.

With the above processing, when two different planes (15004 and 15005) are overlapped, two kinds of locations—where dots overlap (pixels having "1" on both planes) and where dots do not overlap (pixels having "1" on only one plane)—can be made to exist together. More specifically, in image portions of intermediate grayscale values, a certain number of areas are formed in which dots overlap, while in image portions of low grayscale values, dots are prevented from overlapping. So, as explained by referring to FIG. 4, should there be printing position shifts due to variations in distance between the print medium and the ejection opening face of the print head or variations in print medium conveying distance, the image density variations can be suppressed and also graininess in highlighted portions also kept low.

Returning again to FIG. 6, the two planes of image data binarized by the binarization unit 104 are temporarily stored in print buffers 106 corresponding to the individual planes. Then, the image data is read out from the associated print buffers during the relative scan and, according to the image data thus read out, the two print heads 105 of the same color inks perform ink ejection.

As described above, with this embodiment, as many planes of multivalued image data as the number of print heads used are generated according to the dividing number or distribution ratio determined by a grayscale value of the pixel of interest so that the number of print heads that can be used to print that pixel can be changed according to the grayscale value of the pixel. More specifically, for pixels having grayscale values (density values) higher than the threshold n (i.e., areas of intermediate grayscale values), the data division is performed so that printing by two print heads can be done. This allows for creating a highly robust, uniform image. On the other hand, for pixels having grayscale values (density values) lower than the threshold n (highlighted areas), data is generated by not performing the data division to ensure that the areas can be printed by only one print head. This allows for preventing degradations of graininess due to the dot generation delay and overlapping of multiple dots as explained in FIG. 5A. That is, this embodiment can produce an appropriate uniform image with no graininess, whatever grayscale value the image being printed has.

While in FIG. 7, for pixels with grayscale value less than the threshold n, the grayscale value has been explained to be distributed to the first print head plane, it may be distributed to the second print head plane. It is also possible to switch between the first and second print head according to the number of pages or the number of ejections.

Even if the grayscale value is higher than the threshold n, it is not necessary to distribute the data evenly to the two planes. For example, distribution ratios other than the even ratio of 1:1, such as 7:3 or 6:4, may be used for data division. It is also possible to cyclically change the distribution ratio between the two planes according to the pixel position, as disclosed in Japanese Patent Laid-Open No. 2006-231736.

Although this embodiment adopts two print heads for one color, the number of print heads used is not limited to two but needs only to be M (M is an integer equal to 2 or greater). When M print heads are used for the same color ink, the image dividing unit 103 generates M planes of multivalued data for the M print heads according to the dividing number or distribution ratios determined by the grayscale value of the multivalued image data. In that case, what is required is to generate the multivalued image data for the M print heads such that the number of print heads that can be used for printing the pixels having grayscale values less than the threshold is smaller than the number of print heads that can be used for printing the pixels having grayscale values more than the threshold. It is particularly preferred that the image data be divided such that the pixels having grayscale values higher than the threshold can be printed with M print heads and that pixels having grayscale values lower than the threshold can be printed with L print heads fewer than M print heads (L<M).

Although this embodiment adopts a binarization operation as the quantization processing, the quantization processing that can be adopted in this embodiment is not limited to the binarization operation. It is possible to employ a general N-value transformation operation (N is an integer equal to or higher than 2), such as 3- or 4-value transformation operation. For example, when a 3-value transformation operation is adopted, the binarization unit 104 is replaced with a three-value transformation unit and ink ejection is performed based on 3-value data.

Embodiment 2

Figure 8:
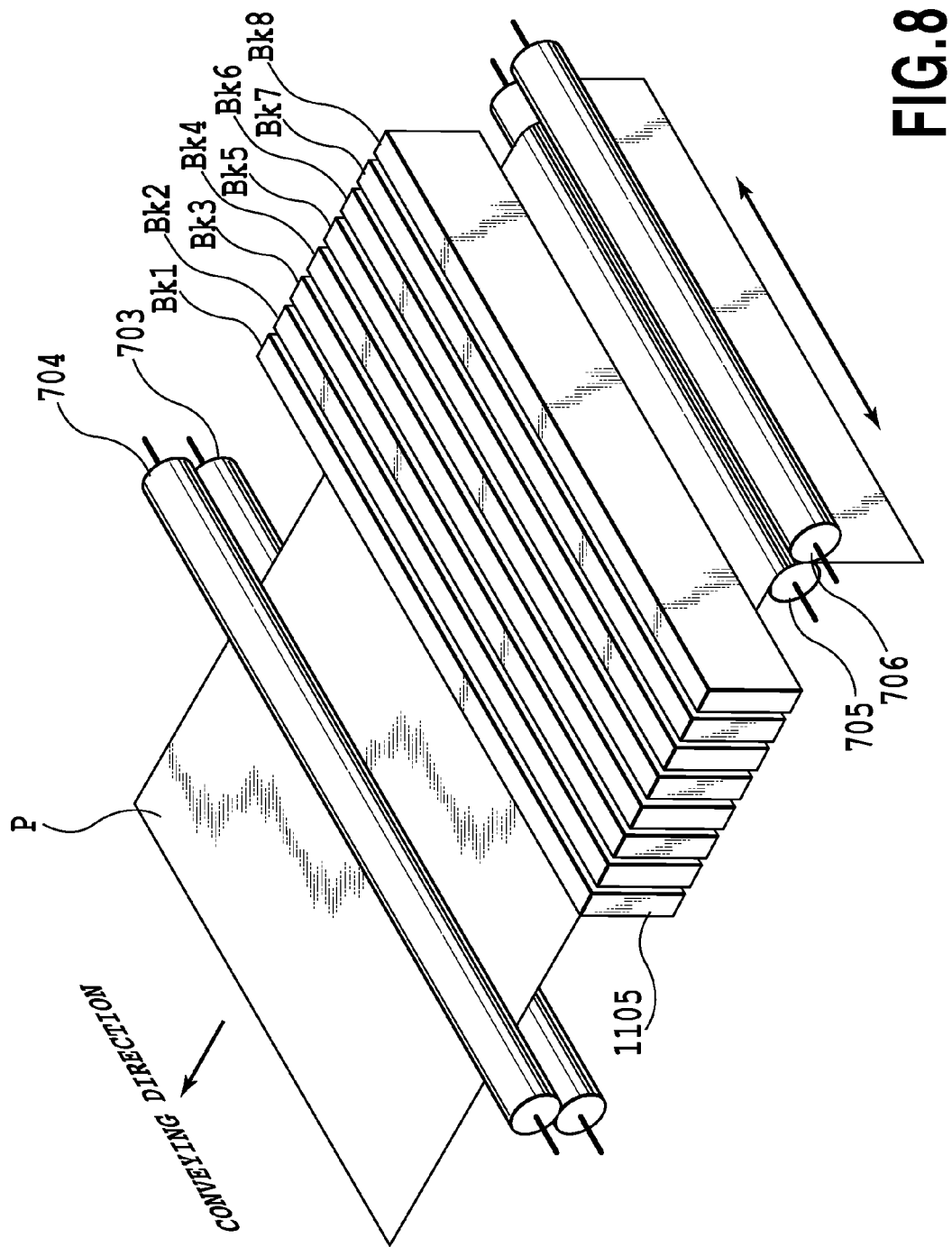
FIG. 8 is a schematic diagram showing an inner construction of a full-line type ink jet printing apparatus used in embodiment 2.

FIG. 8 is a schematic diagram showing an internal construction of a full-line type ink jet printing apparatus used in this embodiment. The printing apparatus of this embodiment is a monochrome printer that produces only black images. The construction of other than a print head 1105 is similar to that of embodiment 1 shown in FIG. 1. In this embodiment too, the number of pieces, into which the input image data having grayscale values lower than the threshold is divided, is set smaller than the division number for the image data having grayscale values higher than the threshold.

The print head 1105 is a full-line type print head having eight black (Bk) printing element arrays Bk1-Bk8 set parallelly side by side along the print medium conveying direction. Black image data at each pixel is divided into eight planes, and 1-pixel-width area (unit area) continuously extending in the print medium conveying direction is printed with dots by eight different printing elements.

The sequence of steps performed by the image processing of this embodiment is almost similar to that of embodiment 1 shown in FIG. 6. It is noted, however, that since there are no data for CMY, the CMYK conversion unit 102 performs a one-dimensional brightness/density conversion process. Thus, the image dividing unit 103 is supplied density data (input image data) from the CMYK conversion unit 102. The image dividing unit 103 of this embodiment, as in embodiment 1, changes the division number or distribution ratio according to the grayscale value of the image data for each pixel to create 8 planes of multivalued image data.

Figure 9:
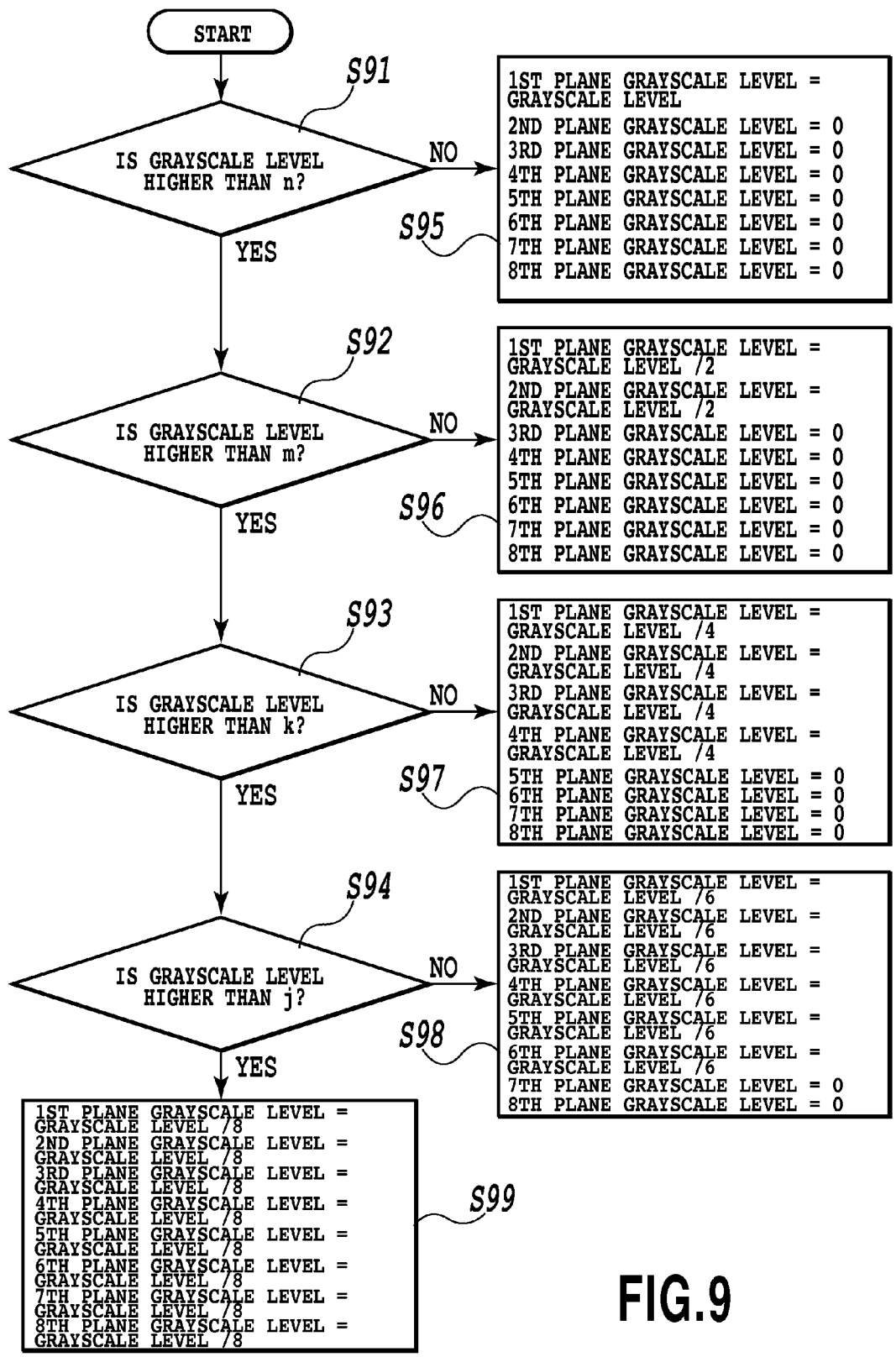
FIG. 9 is a flow chart showing a sequence of steps performed on individual pixels by an image dividing unit 103 of embodiment 2.

FIG. 9 is a flow chart showing a sequence of steps that the image dividing unit 103 of this embodiment executes in a plane dividing process. In this embodiment, four different thresholds (n, m, k, j) are provided and, according to a threshold stage of the grayscale value of the multivalued image data, the number of print heads to which the grayscale value is distributed is changed.

First, the image dividing unit 103 in step S91 checks if the grayscale value (density value) of the pixel of interest (the pixel being processed) is higher than the threshold n. If the grayscale value of the pixel is found to be less than the threshold n, the process moves to step S95 where it distributes all of the grayscale value to the first print head plane, giving a grayscale value 0 to the remaining 2nd to 8th print head plane. That is, according to a distribution ratio of [1st plane:2nd plane:3rd plane:4th plane:5th plane:6th plane:7th plane:8th plane=1:0:0:0:0:0:0:0], eight planes of data are generated, without the grayscale value of the original image data being divided.

If on the other hand the grayscale value of the pixel being processed is found to be higher than the threshold n, the process moves to step S92 where it further checks if the grayscale value that was determined to be greater than n is higher than a threshold m, which is greater than n. If the grayscale value of the pixel is found less than the threshold m, the process proceeds to step S96 where it distributes one-half of the grayscale value to the first print head plane and the second print head plane, respectively, giving a grayscale value 0 to the remaining 3rd to 8th print head plane. That is, according to a distribution ratio of [1st plane:2nd plane:3rd plane:4th plane:5th plane:6th plane:7th plane:8th plane 1:1:0:0:0:0:0:0], the grayscale value of the image data is divided in two to generate eight planes of data.

If step S92 decides that the grayscale value of the pixel of interest is higher than the threshold m, the process moves to step S93. Step S93 checks whether the grayscale value, that was determined to be higher than m, is greater than a still higher threshold k. If the grayscale value of the pixel is determined to be less than the threshold k, the process moves to step S97 where it distributes ¼ of the grayscale value to four planes of first to fourth print head, respectively, giving a grayscale value 0 to the remaining 5th to 8th print head plane. That is, according to a distribution ratio of [1st plane:2nd plane:3rd plane:4th plane:5th plane:6th plane:7th plane:8th plane=1:1:1:1:0:0:0:0], the grayscale value of the image data is divided in four to generate eight planes of data.

If step S93 decides that the grayscale value of the pixel of interest is higher than the threshold k, the process moves to step S94. Step 94 checks whether the grayscale value, that was determined to be higher than k, is greater than a still higher threshold j. If the grayscale value of the pixel is less than the threshold j, the process moves to step S98 where it distributes 1/6 of the grayscale value to six planes of first to sixth print head, respectively, giving a grayscale value 0 to the remaining 7th and 8th print head plane. That is, according to a distribution ratio of [1st plane:2nd plane:3rd plane:4th plane:5th plane:6th plane:7th plane:8th plane=1:1:1:1:1:1:0:0], the grayscale value of the image data is divided in six to generate eight planes of data.

If step 94 decides that the grayscale value of the pixel of interest is higher than the threshold j, the process moves to step 99. In step 99 the process distributes 1/8 of the grayscale value to the eight planes of all print heads, respectively. That is, according to a distribution ratio of [1st plane:2nd plane:3rd plane 4th plane:5th plane:6th plane:7th plane:8th plane=1:1:1:1:1:1:1:1], the grayscale value of the image data is divided in eight to generate eight planes of data.

As described above this embodiment is characterized in that as many planes of multivalued image data as the number of print heads used are created, based on the division number or distribution ratio determined by a grayscale value of each pixel (input image data), so that the number of print heads to be used for printing that pixel can be changed according to the grayscale value. More specifically, the data division is performed in such a way that a greater number of print heads can be used to print a pixel having a higher grayscale value. This makes it possible to divide, according to each grayscale value, the image data to as many planes as possible to alleviate image impairments, such as graininess caused by dot generation delay and overlapping of multiple dots, to an unnoticeable value. As a result, a uniform, highly robust image with suppressed graininess can be realized for an entire grayscale range.

In this embodiment, the number of thresholds and the value of each threshold are not limited to particular ones and may be set to appropriate values according to the magnitude of dot generation delay, the state of graininess or the degree of density variations. It is also possible to select, from among the print heads 1-8, those to which the image data is to be divided, according to the number of pages or the number of ejections, as in embodiment 1. Further, when the image data is divided into a plurality of planes, it is, as already pointed out in embodiment 1, not necessary to divide data evenly to these planes. Depending on the position of the pixel to be printed, the distribution ratio for a plurality of planes may be changed cyclically. Whatever method is used, this embodiment can effectively be applied by dividing the grayscale value to the number of (L) planes that is determined by the grayscale value of the pixel and distributing a grayscale value 0 to the remaining M to L planes.

In this embodiment too, as in embodiment 1, the number of print heads used is not limited at all and needs only to be M (M is an integer equal to 2 or greater). In this case, as described earlier, the only requirement is to divide the image data such that the number of print heads used for printing the pixel having a grayscale value less than the threshold is smaller than the number of print heads used for printing the pixel having a grayscale value more than the threshold.

Embodiment 3

This embodiment uses a serial type printing apparatus and an example case of printing an image by a 2-pass printing operation will be described. Here, 2-pass printing refers to a printing method that scans the print head twice over a unit area of the print medium to complete an image that is supposed to be printed in the unit area. In this serial type printing apparatus, the operation of moving the print head as it prints dots corresponds to the "relative scan".

Figure 14:
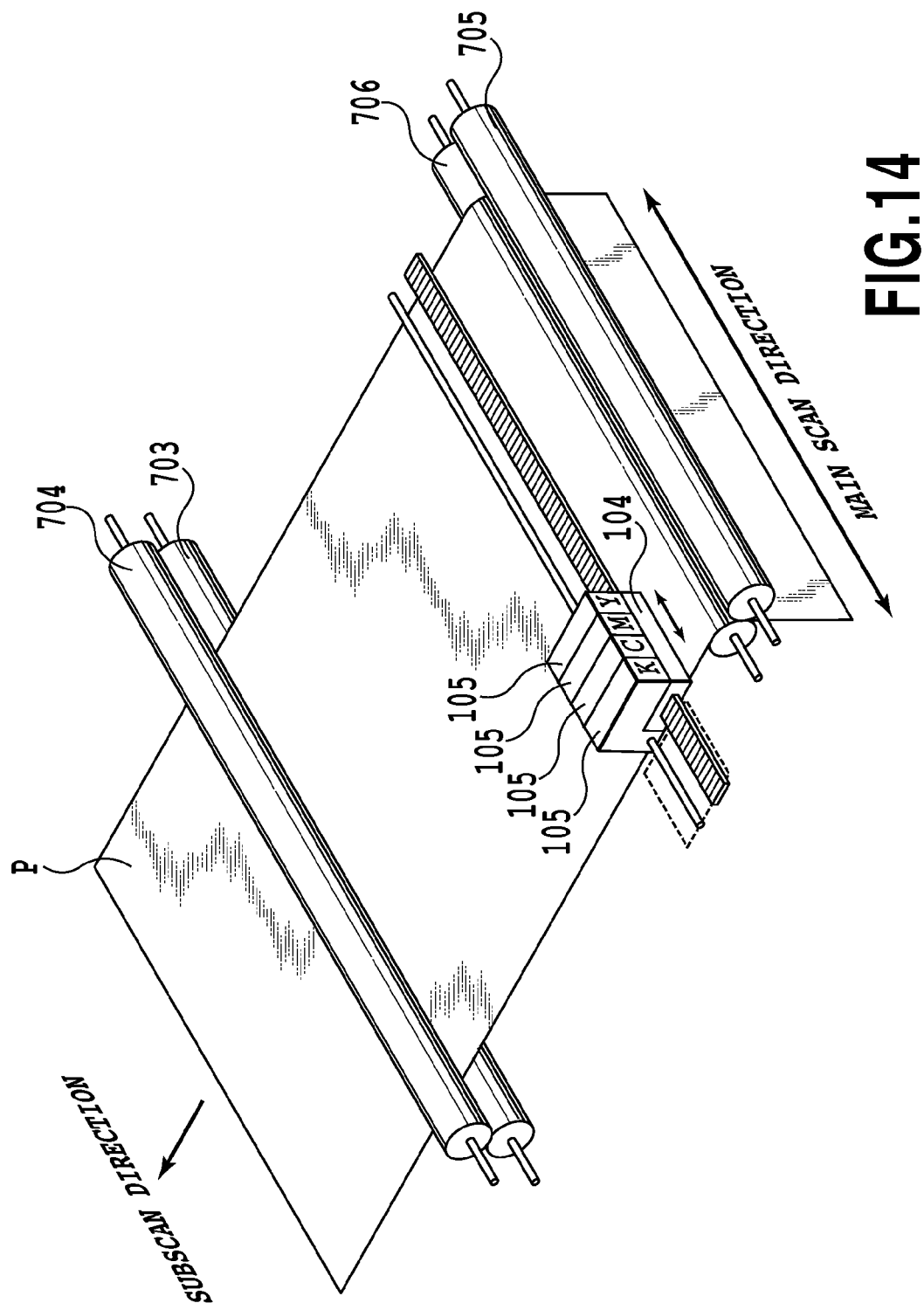
FIG. 14 is a schematic diagram showing an inner construction of a serial type ink jet printing apparatus applicable to the present invention.

FIG. 14 is a schematic diagram showing an internal construction of a serial type ink jet printing apparatus used in this embodiment. Mounted in a carriage 104 that moves in the main scan direction, the print head 105 ejects ink as the carriage moves. When one printing scan is complete, the conveying roller 704 and the auxiliary roller 703 rotate to convey the print medium P, gripped between the pair of rollers 704, 703 and between the supply roller 705 and the auxiliary roller 706, in a subscan direction (conveying direction) indicated with an arrow. By repeating the printing main scan and the medium conveying operation, the print medium P is progressively printed with an image.

The print head 105 includes print heads for black (K), cyan (C), magenta (M) and yellow (Y). These four color print heads are parallelly arranged side by side in the main scan direction as shown. Each of the four color print heads has a plurality of printing elements (nozzles) for ink ejection arrayed in a subscan direction at a predetermined density. In this embodiment, the number of printing elements arrayed in each of the color print heads is 1,280.

Next, one example of multipass printing applicable to this invention will be described by referring to FIG. 15. Here, a 2-pass printing is taken as an example of multipass printing but, as described later, this invention is not limited to the 2-pass printing. The multipass printing needs only to be an M-pass printing (N is an integer equal to 2 or more), such as 3-, 4-, 8- and 16-pass printing.

Figure 15:
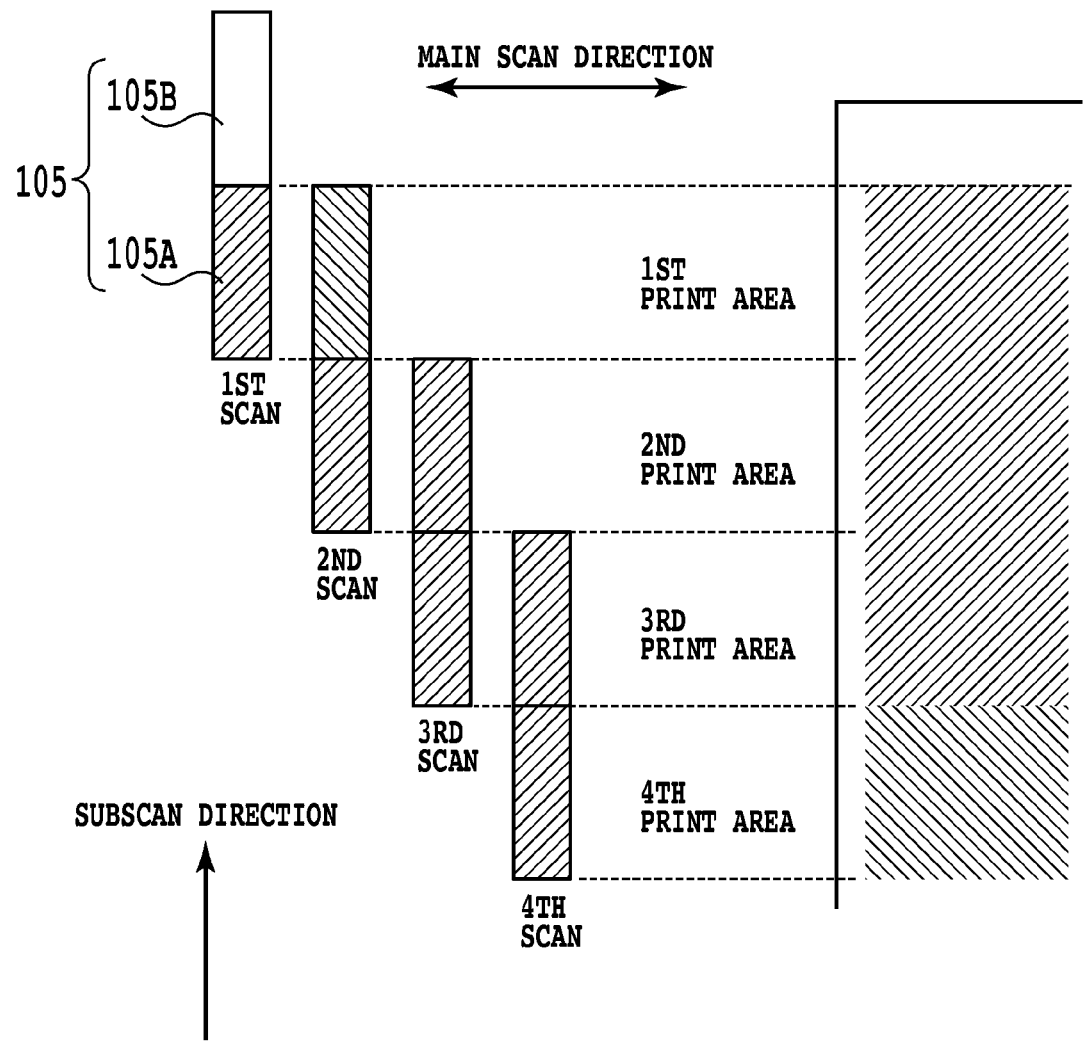
FIG. 15 shows a 2-pass printing process.

FIG. 15 schematically illustrates how the 2-pass printing is performed, showing a relative positional relation between the print head 105 and the print areas when the 1st to 4th print area are printed. FIG. 15 shows only one of the four color print heads 105 shown in FIG. 14. In the following description, of the plurality of printing elements (nozzles) arrayed in the print head 105, one half of the nozzle array on the upstream side in the medium conveying direction is referred to as an upstream nozzle group 105A, and the other half of the nozzle array on the downstream side in the medium conveying direction is referred to as a downstream nozzle group 105B. A width of each print area in the subscan direction (medium conveying direction) is about half the span of the printing element array in the print head (640-nozzle width=½×1,280-nozzle width).

In the first scan, the upstream nozzle group 105A is used to print only a part of the image to be printed in the first print area. This is followed by the print medium being conveyed a distance equal to 640 nozzles in the subscan direction. Next, in the second scan, the upstream nozzle group 105A is used to print only a part of the image to be printed in the second print area and at the same time the downstream nozzle group 105B is used to complete the image in the first image area. That is, that part of the image to be printed in the first print area which was not printed by the upstream nozzle group 105A is complementarily printed by the downstream nozzle group 105B. Then, the print medium is conveyed a distance equal to 640 nozzles in the subscan direction. Next, in the third scan, the upstream nozzle group 105A is used to print only a part of the image to be printed in the third print area and at the same time the downstream nozzle group 105B is used to complete the image in the second image area. Then, the print medium is conveyed a distance equal to 640 nozzles in the subscan direction. As a final step, in the fourth scan, the upstream nozzle group 105A is used to print only a part of the image to be printed in the fourth print area and at the same time the downstream nozzle group 105B is used to complete the image in the third print area. This is followed by the print medium being conveyed a distance equal to 640 nozzles in the subscan direction. In other print areas the similar printing operation is also performed. By repetitively alternating the printing main scan and the medium conveying operation, the 2-pass printing is performed to complete an image.

Figure 10:
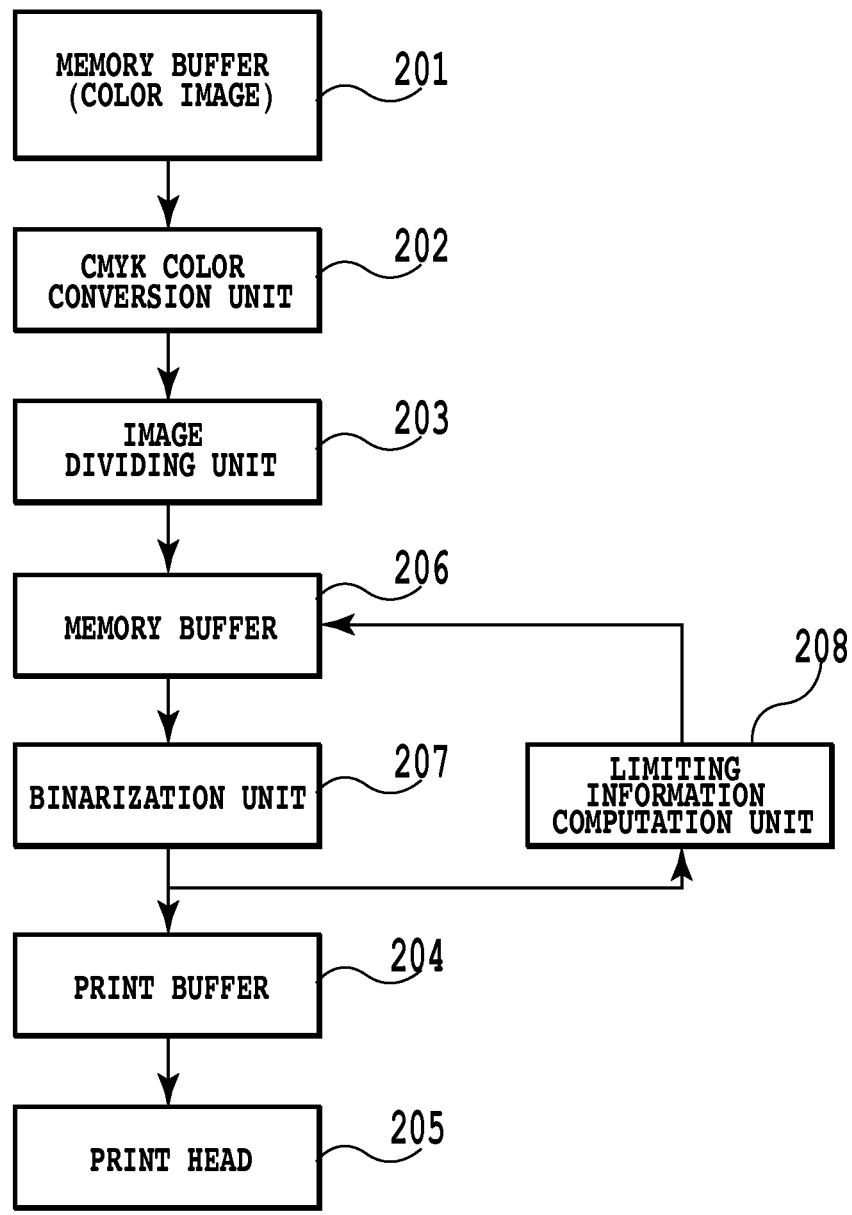
FIG. 10 is a block diagram showing a sequence of steps of image processing as performed by the printing apparatus of embodiment 3.
Figure 13:
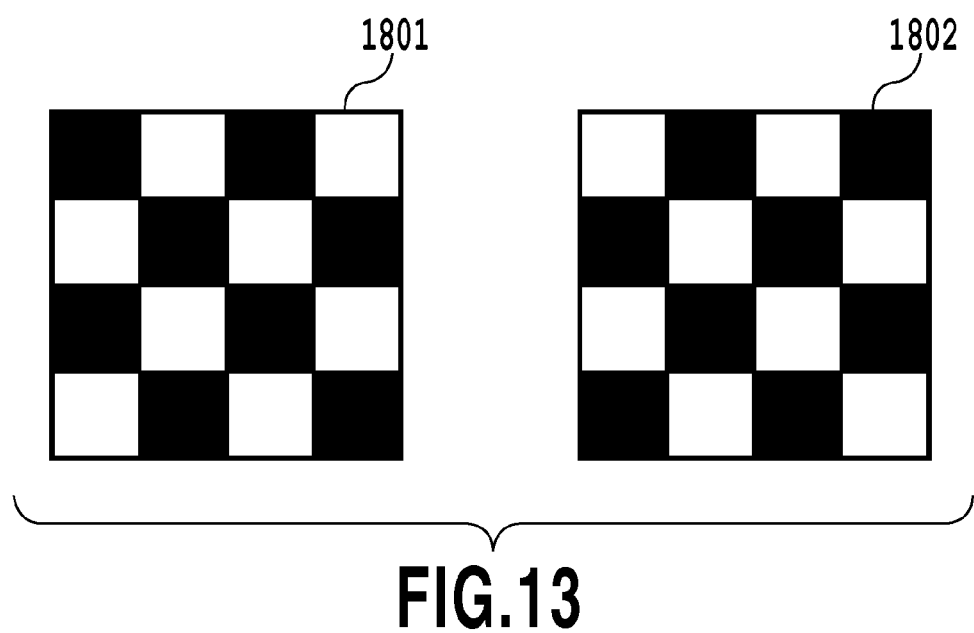
FIG. 13 shows an example of mask pattern that can be used for a 2-pass printing.

FIG. 10 is a block diagram showing a sequence of steps that the printing apparatus of this embodiment executes during the image processing. This embodiment is characterized in that the binarization operation is performed by the binarization unit 207 taking the results of binarization of other planes into consideration to ensure that dots printed by the same printing scan are scattered as evenly as possible and that dots printed by the different printing scans will not overlap too much. More specifically, in the process of successively performing the quantization processing (binarization operation) on multivalued data of different planes generated by the image dividing unit 203, the binarization results of the already processed planes are taken into account in executing the binarization operation on the subsequent planes. In more detail, correction data (limitation information) for correcting the multivalued image data to be subsequently quantized is determined based on the results of already executed quantization operations. Then the subsequent quantization operation is performed on the multivalued image data corrected by the correction data (limitation information). This is intended to lower the probability that those pixels that have been determined to be printed with dots by the preceding quantization operations will be determined to be printed with dots by the subsequent quantization operations. Details of the image dividing operation performed in this embodiment will be detailed as follows.

In this embodiment, too, the image dividing unit 203 executes the dividing operation on each pixel according to the flow chart of FIG. 7. That is, for those pixels having grayscale values higher than the threshold n, the grayscale value is divided into the first plane and the second plane. More specifically, according to a distribution ratio of [1st plane:2nd plane=1:1], the multivalued image data is divided in two to create two planes of multivalued image data. For those pixels having grayscale values lower than the threshold n, an entire value of the multivalued data is distributed to the first plane and zero to the second plane. In other words, according to a distribution ratio of [1st plane:2nd plane=1:0], two planes of multivalued image data is generated, without the grayscale value of the original multivalued image data being divided in two. The two planes of multivalued data generated by the image dividing unit 203 as described above are stored in the associated areas in the memory buffer 206. Here, a plane associated with a first printing scan over a unit area of the print medium is defined to be a first plane and a plane associated with the second printing scan over the unit area of the print medium is defined to be a second plane. A plane corresponding to an odd-numbered scan is defined as the first plane and a plane corresponding to an even-numbered scan as the second plane.

As described above, for pixels having grayscale values higher than the threshold (high grayscale pixels), the image dividing unit 203 creates two planes of image data corresponding to two relative movements so that each of the high grayscale pixels can be printed with two relative scans of the print head. For pixels having grayscale values lower than the threshold (low grayscale pixels), the image dividing unit 203 creates two planes of image data corresponding to two relative movements so that each of the low grayscale pixels can be printed with one relative scan of the print head.

The following processing is done beginning with the first plane. The multivalued image data of the first plane is stored as is in the memory buffer 206 and then transferred to the binarization unit 207.

The binarization unit 207, as in the above embodiment, performs the binarization operation on each piece of image data stored in the memory buffer 206 by using an error diffusion method or dither matrix. Here, the first plane of multivalued image data is quantized into first plane binary data by the error diffusion operation using an error distribution matrix A shown in FIG. 16A. The binary data thus obtained is transferred to the print buffer 204 and also to the limitation information calculation unit 208. Once data for one printing scan is stored in memory, the print head 205 ejects ink according to the binary data stored in the print buffer 204 as it is moved relative to the print medium.

FIGS. 11A and 11B show coefficients that the limitation information calculation unit 208 uses when performing a filter calculation on the first plane binary data output from the binarization unit 207, and a calculated result. A pixel shown shaded is a pixel of interest being processed by the binarization unit 207. The limitation information calculation unit 208 distributes the binarization result of the pixel of interest to neighboring pixels according to the coefficients shown in FIG. 11A. More specifically, if an output from the binarization unit 207 is 1 (print), the value "1" is converted into, for instance, 255 and then the converted value of 255 and the coefficients of FIG. 11A are multiplied. Resultant values for the pixel of interest and neighboring pixels are as shown in FIG. 11B. That is, if the output from the binarization unit 207 represents "print (255)", a result of distribution of this value to the neighboring pixels is as shown in FIG. 11B.

FIG. 12 is an image diagram which shows an output result from the binarization unit 207 (binary data before a filtering operation) and a result of performing the filtering operation on the output (filtered data). The limitation information calculation unit 208 converts the distribution values (values of FIG. 11B) thus obtained into minus values, adds these converted values to pre-binarization multivalued data for the first plane to produce correction data (limitation information). This correction data is multivalued correction data for correcting the second plane multivalued image data. The multivalued correction data (limitation information) thus obtained is stored in the second plane pixel position of the memory buffer 206.

The subsequent second plane processing adds the limitation information (multivalued correction data) stored in the memory buffer 206 to the multivalued image data created by the image dividing unit 203 and stores the addition result. Then, the binarization operation similar to the one for the first plane is performed. Here, the error diffusion operation based on the error distribution matrix A of FIG. 16 is used to quantize the second plane multivalued image data into binary data for the second plane. The binary data thus obtained is transferred to the print buffer 204. The binarized result for the second plane is not transferred to the limitation information calculation unit 208.

In the above processing, the second plane binarization operation causes the pixel that was determined to be printed (1) in the first plane to have data value lower than the original value, lowering the probability of the pixel of interest and its neighboring pixels being determined to be printed (1). That is, the probability that the pixel, which was determined to be printed with dot by the first plane error diffusion operation (preceding error diffusion operation), will be determined to be printed with dot by the second plane error diffusion operation (subsequent error diffusion operation) decreases. As a result, the percentage of pixels where the dots of the first plane and the dots of the second plane overlap can be reduced, thereby preventing heavy graininess caused by too much dot overlapping.

As already explained, to suppress density variations stemming from inter-plane deviations, it is essential for the dots printed by a plurality of printing scans to have no complementary relation between the printing scans. That is, the density variations are effectively prevented by having dots formed by different printing scans overlap in some pixels. However, too many such pixels may lead to a reduced dot coverage and therefore a reduced density and may also cause too much dot overlapping and resultant heavy graininess. Having dots formed by different printing scans overlap in some pixels and at the same time keeping the percentage of such pixels low, as in this embodiment, makes it possible to keep the density variations to an appropriate value without printing too many pixels with overlapping dots.

Further, with this embodiment, dots printed by different printing scans can be properly scattered, suppressing low-frequency components of dots of an image. This in turn reduces graininess caused by dots arranged in one plane (within the same printing scan). When there are inter-plane deviations (deviations between different printing scans), dot textures in individual planes become noticeable and may be recognized as image impairments. However, if the dots in each plane are arranged in such a way as will keep graininess unnoticeable, the inter-plane deviations hardly cause image impairments. That is, in addition to being able to enhance the scattered value of dots in highlighted range of an image, this embodiment can also increase robustness against not only grayscale variations but also against textures even in images with an intermediate grayscale value or higher in which priority is given to grayscale uniformity.

Although this embodiment has described a 2-pass printing as an example, it can also be applied to multipass printing with a higher number of passes M (M is an integer equal to 2 or higher). In performing an M-pass printing, the image dividing unit 203, as in embodiment 2, divides the input multivalued image data according to the grayscale value to create M planes (1st to Mth plane) of multivalued image data. Then, the limitation information calculation unit 208 successively stores and accumulates at predetermined pixel positions in the memory buffer 206 differences between the results of filtering the first to (M−1)th plane and the divided pieces of multivalued data. Therefore, when the M planes of data are binarized in the way described above, a pixel that has already been printed with a dot (1) in one of the 1st to (M−1)th plane becomes less likely to be printed with a dot during an Mth printing scan. That is, the probability of dots printed by different printing scans overlapping each other can be lowered. This in turn produces dot arrangements that exhibit low graininess and high robustness against grayscale variations.

In this embodiment, the filter used in the limitation information calculation unit 208 has been described to be an isotropic weighted mean filter which, as shown in FIG. 11A, has a 3×3-pixel area with coefficients arranged almost concentrically. The filter is not limited to this type. It may be an isotropic filter of a wider square, such as 5×5- or 7×7-pixel square, or an anisotropic filter of a rectangle, such as 5×7- or 5×9-pixel rectangle, with filter coefficients arranged in oval shape. It may also be a low-pass, band-pass or high-pass characteristic filter.

Although this embodiment adopts a binarization operation as the quantization processing, the quantization processing that can be adopted in this embodiment is not limited to the binarization operation. It is possible to employ any of N-value transformation operations (N is an integer equal to or higher than 2), such as 3- or 4-value transformation operation. When a 3-value transformation operation is adopted, the binarization unit 207 is replaced with a three-value transformation unit and ink ejection is performed according to 3-value data. Further, although this embodiment has described an example case of using the error diffusion method as the quantization operation, the quantization operation is not limited to the error diffusion method but may employ, for example, a dither operation.

As described above, this embodiment distributes the input image data into M planes of multivalued image data according to a division number or distribution ratio determined by the grayscale value of the input image data, the M corresponding to the M relative printing scans of the print head (M is an integer equal to or higher than 2). At this time the M planes of image data need to be created such that the number of scans used to print pixels having grayscale values below the threshold is less than the number of scans used to print pixels having grayscale values higher than the threshold. It is particularly preferred to create image data so that pixels having grayscale values higher than the threshold can be printed by M relative scans and that pixels having grayscale values lower than the threshold can be printed by L relative scans (L<M).

Other Embodiments

Although the printing apparatus has been described as a full-line type in embodiment 1 and 2 and as a serial type in embodiment 3, the processing methods of all embodiments are of course suitably applicable to both of the full-line type and serial type. For example, if a plurality of planes corresponding to a plurality of print heads in embodiment 1 and 2 are replaced with a plurality of planes corresponding to a plurality of relative scans, the methods of embodiment 1 and 2 can also be applied to the serial type printing apparatus. Conversely, if a plurality of planes corresponding to a plurality of relative scans in embodiment 3 is replaced with a plurality of planes corresponding to a plurality of print heads, the method of embodiment 3 can be applied to the full-line type printing apparatus.

Further, while in all of the above embodiments the ink jet printing apparatus has been used, this invention is not limited to such a printing apparatus. This invention can be suitably applied to any type of printing apparatus as long as the printing apparatus forms an image on a print medium by the print head for printing dots during a relative movement of the print head and the print medium.

Although the above embodiments adopt a binarization operation as the quantization processing, the quantization processing that can be adopted in this invention is not limited to the binarization operation. It is possible to employ a general N-value transformation operation (N is an integer equal to or greater than 2), such as 3- or 4-value transformation operation.

While the printing apparatus (image forming apparatus) with the image processing function shown in FIGS. 6, 7 and 9 has been taken up as an example to describe the image processing characteristic of this invention, this invention is not limited to such a configuration. The image processing of this invention may be configured to be executed by a host device to feed binarized image data into the printing apparatus. Further, images or graphic images shot by digital cameras may be entered directly into the printing apparatus without an intervention of a host device to execute the entire characteristic image processing by the printing apparatus. The role of the image processing apparatus of this invention is played by the host device in the former case and, in the latter case, by the printing apparatus. The image processing characteristic of this invention refers, as can be seen from the above embodiments, to the processing in which the same number of planes of multivalued image data as the number of print heads or of the printing scans are created according to the division number or distribution ratio determined by the grayscale value of the input image data and in which the plurality of planes of multivalued image data are individually quantized. This invention is also characterized in that the data is generated such that the number of print heads and the number of printing scans used to print pixels with low grayscale values are smaller than those used to print pixels with high grayscale values.

The present invention is also realized by program codes implementing the above image processing function or by storage media storing the program codes. In that case, the above image processing is implemented by a host device or a computer (or CPU or MPU) in the printing apparatus reading and executing the program codes. Therefore, computer-readable programs read by the computers to execute the above image processing and storage media storing these programs are also included in this invention.

Among storage media that may be used to carry program codes are, for example, floppy (registered trademark) disks, hard disks, optical discs, magneto-optical discs, CD-ROMs, CD-Rs, magnetic tapes, nonvolatile memory cards and ROMs.

Not only can the functions of the above embodiments be realized by a computer reading and executing the program codes but operating system (OS) running on that computer may execute a part or all of the actual processing according to instructions from the program codes. Further, after the program codes are written into a memory installed in a function expansion board inserted in the computer or a function expansion unit connected to the computer, a CPU may execute a part or all of the actual processing according to the instructions from the program codes.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-329336, filed Dec. 20, 2007, which is hereby incorporated by reference herein in its entirety.

What is claimed is:

1. An image processing apparatus for processing image data corresponding to an area of the print medium so as to perform printing to the area by a plurality of relative movements between a print head and the print medium, the image processing apparatus comprising:
   a generation unit configured to generate, based on the image data, a plurality of pieces of multi-valued image data corresponding to the plurality of relative movements respectively and corresponding to the same color; and
   a quantization unit configured to quantize each of the plurality of pieces of multi-valued image data generated by said generation unit;
   wherein said generation unit generates the plurality of pieces of multi-valued image data such that the number of the pieces of the multi-valued image data for printing of an area to which the image data having a gray scale value lower than a first value corresponds is a first number, the number of pieces of the multi-valued image data for printing of an area to which the image data having a gray scale value higher than the first value and lower than a second value corresponds is a second number higher than the first number, and the number of the pieces of the multi-valued image data for printing of an area to which the image data having a gray scale value higher than the second value corresponds is a third number higher than the second number.

2. The image processing apparatus according to claim 1, wherein said quantization unit successively performs quantization processes on the plurality of pieces of multi-valued image data and performs subsequent quantization process according to the results of the preceding quantization process.

3. The image processing apparatus according to claim 2, wherein said quantization unit, according to the results of the preceding quantization process, determines correction data for correcting multi-valued image data on which the subsequent quantization process is to be performed and performs the subsequent quantization process on the multi-valued image data corrected by the correction data.

4. The image processing apparatus according to claim 2, wherein said quantization unit, according to the results of the preceding quantization process, performs the subsequent quantization process in such a way as to reduce a probability that a formation of one or more dots will be determined by the subsequent quantization process, to an area that a formation of one or more dots has already been determined by the preceding quantization process.

5. The image processing apparatus according to claim 1, wherein the quantization process is an error diffusion process or a dither process.

6. The image processing apparatus according to claim 1, further comprising a driving unit configured to drive the print head according to the image data quantized by said quantization unit.

7. An image processing apparatus for processing image data corresponding to an area of the print medium so as to perform printing to the area by a relative movement between a plurality of print heads and the print medium, the image processing apparatus comprising:
   a generation unit configured to generate, based on the image data, a plurality of pieces of multi-valued image data corresponding to the plurality of print heads respectively and corresponding to the same color; and
   a quantization unit configured to quantize each of the plurality of pieces of multi-valued image data generated by said generation unit;
   wherein said generation unit generates the plurality of pieces of multi-valued image data such that the number of the pieces of the multi-valued image data for printing of an area to which the image data having a gray scale value lower than a first value corresponds is a first number, the number of the pieces of the multi-valued image data for printing of an area to which the image data having a gray scale value higher than the first value and lower than a second value corresponds is a second number higher than the first number, and the number of the pieces of the multi-valued image data for printing of an area to which the image data having a gray scale value higher than the second value corresponds is a third number higher than the second number.

8. An image processing apparatus for processing image data corresponding to an area of the print medium so as to perform printing to the area by a plurality of relative movements between a print head and the print medium, the image processing apparatus comprising:

a generation unit configured to generate, based on the image data, a plurality of pieces of multi-valued image data corresponding to the plurality of relative movements; and a quantization unit configured to quantize each of the plurality of pieces of multi-valued image data generated by said generation unit;

wherein said generation unit generates the plurality of pieces of multi-valued image data without dividing the gray scale value of the image data when the gray scale value of the image data is lower than a first predetermined value, generates a first number of pieces of multi-valued image data by dividing the gray scale value of the image data when the gray scale value of the image data is higher than the first predetermined value and lower than a second predetermined value, and generates a second number higher than the first number of pieces of multi-valued image data by dividing the gray scale value of the image data when the gray scale value of the image data is higher than the second predetermined value.

9. An image processing apparatus for processing image data corresponding to an area of the print medium so as to perform printing to the area by a relative movement of a plurality of print heads between and the print medium, the image processing apparatus comprising:

a generation unit configured to generate, based on the image data, a plurality of pieces of multi-valued image data corresponding to the plurality of print heads; and a quantization unit configured to quantize each of the plurality of pieces of multi-valued image data generated by said generation unit;

wherein said generation unit generates the plurality of pieces of multi-valued image data without dividing the gray scale value of the image data when the gray scale value of the image data is lower than a first predetermined value, generates a first number of pieces of multi-valued image data by dividing the gray scale value of the image data when the gray scale value of the image data is higher than the first predetermined value and lower than a second predetermined value, and generates a second number higher than the first number of pieces of multi-valued image data by dividing the gray scale value of the image data when the gray scale value of the image data is higher than the second predetermined value.

10. An image processing apparatus to process image data corresponding to an area of the print medium so as to perform printing to the area by a plurality of relative movements between a print head and the print medium, the image processing apparatus comprising:

a generation unit configured to generate a plurality of pieces of multi-valued image data corresponding to the plurality of relative movements and corresponding to the same color by dividing the image data into a number of pieces according to gray scale value of the image data corresponding to the area; and a quantization unit configured to quantize each of the plurality of pieces of multi-valued image data generated by said generation unit;

wherein the number of pieces for the image data having a gray scale value lower than a first value is a first number, the number of the pieces for the image data having a gray scale value higher than the first value and lower than a second value is a second number higher than the first number, and the number of the pieces for the image data having a gray scale value higher than the second value is a third number higher than the second number.

11. An image processing apparatus for processing image data corresponding to an area of the print medium so as to perform printing to the area by a relative movement between a plurality of print heads and the print medium, the image processing apparatus comprising:

a generation unit configured to generate a plurality of pieces of multi-valued image data corresponding to the plurality of print heads and corresponding to the same color by dividing the image data into a number of pieces according to gray scale value of the image data corresponding to the area; and a quantization unit configured to quantize each of the plurality of pieces of multi-valued image data generated by said generation unit;

wherein the number of pieces for the image data having a gray scale value lower than a first value is a first number, the number of the pieces for the image data having a gray scale value higher than the first value and lower than a second value is a second number higher than the first number, and the number of the pieces for the image data having a gray scale value higher than the second value is a third number higher than the second number.

12. An image processing method for processing image data corresponding to an area of the print medium so as to perform printing to the area by a plurality of relative movements between a print head and the print medium, the image processing method comprising the steps of:

generating, based on the image data, a plurality of pieces of multi-valued image data corresponding to the plurality of relative movements respectively and corresponding to the same color; and quantizing each of the plurality of pieces of multi-valued image data generated by the generation step;

wherein, in the generation step, the plurality of pieces of multi-valued image data are generated such that the number of the pieces of the multi-valued image data for performing printing of an area to which the image data having a gray scale value lower than a first value corresponds is a first number, the number of the pieces of the multi-valued image data for printing of an area to which the image data having a gray scale value higher than the first value and lower than a second value corresponds is a second number higher than the first number, and the number of the pieces of the multi-valued image data for printing of an area to which the image data having a gray scale value higher than the second value corresponds is a third number higher than the second number.

13. An image processing method for processing image data corresponding to an area of the print medium so as to perform printing to the area by a relative movement between a plurality of print heads and the print medium, the image processing method comprising the steps of:

generating, based on the image data, a plurality of pieces of multi-valued image data corresponding to the plurality of print heads respectively and corresponding to the same color; and quantizing each of the plurality of pieces of multi-valued image data generated by the generation step;

wherein, in the generation step, the plurality of pieces of multi-valued image data are generated such that the number of the pieces of the multi-valued image data for printing of an area to which the image data having a gray scale value of lower than a first value corresponds is a first number, the number of the pieces of the multi-valued image data for printing of an area to which the image data having a gray scale value higher than the first value and lower than a second value corresponds is a second number higher than the first number, and the number of the pieces of the multi-valued image data for printing of an area to which the image data having a gray scale value higher than the second value corresponds is a third number higher than the second number.

14. An image processing method for processing image data corresponding to an area of the print medium so as to perform printing to the area by a plurality of relative movements between a print head and the print medium, the image processing method comprising the steps of:

generating, based on the image data, a plurality of pieces of multi-valued image data corresponding to the plurality of relative movements; and quantizing each of the plurality of pieces of multi-valued image data generated by the generation step;

wherein the generation step generates the plurality of pieces of multi-valued image data without dividing the gray scale value of the image data when the gray scale value of the image data is lower than a first predetermined value, generates a first number of pieces of multi-valued image data by dividing the gray scale value of the image data when the gray scale value of the image data is higher than the first predetermined value and lower than a second predetermined value, and generates a second number higher than the first number of pieces of multi-valued image data by dividing the gray scale value of the image data when the gray scale value of the image data is higher than the second predetermined value.

15. An image processing method for processing image data corresponding to an area of the print medium so as to perform printing to the area by a relative movement between a plurality of print heads and the print medium, the image processing method comprising the steps of:

generating, based on the image data, a plurality of pieces of multi-valued image data corresponding to the plurality of print heads; and quantizing each of the plurality of pieces of multi-valued image data generated by the generation step;

wherein the generation step generates the plurality of pieces of multi-valued image data without dividing the gray scale value of the image data when the gray scale value of the image data is lower than a first predetermined value, generates a first number of pieces of multi-valued image data by dividing the gray scale value of the image data when the gray scale value of the image data is higher than the first predetermined value and lower than a second predetermined value, and generates a second number higher than the first number of pieces of multi-valued image data by dividing the gray scale value of the image data when the gray scale value of the image data is higher than the second predetermined value.

16. An image processing method for processing image data corresponding to an area of the print medium so as to perform printing to the area by a plurality of relative movements between a print head and the print medium, the image processing method comprising the steps of:

generating a plurality of pieces of multi-valued image data corresponding to the plurality of relative movements and corresponding to the same color by dividing the image data into a number of pieces according to a gray scale value of the image data corresponding to the area; and quantizing each of the plurality of pieces of multi-valued image data generated by the generation step;

wherein the number of pieces for the image data having a gray scale value lower than a first value is a first number, the number of the pieces for the image data having a gray scale value higher than the first value and lower than a second value is a second number higher than the first number, and the number of the pieces for the image data having a gray scale value higher than the second value is a third number higher than the second number.

17. An image processing method for processing image data corresponding to an area of the print medium so as to perform printing to the area by a relative movement between a plurality of print heads and the print medium, the image processing method comprising the steps of:

generating a plurality of pieces of multi-valued image data corresponding to the plurality of print heads and corresponding to the same color by dividing the image data into a number of pieces according to a gray scale value of the image data corresponding to the area; and quantizing each of the plurality of pieces of multi-valued image data generated by the generation step;

wherein the number of pieces for the image data having a gray scale value lower than a first value is a first number, the number of the pieces for the image data having a gray scale value higher than the first value and lower than a second value is a second number higher than the first number, and the number of the pieces for the image data having a gray scale value higher than the second value is a third number higher than the second number.

* * * * *